United States Patent
Nakao et al.

(10) Patent No.: US 7,675,889 B2
(45) Date of Patent: Mar. 9, 2010

(54) NETWORK TERMINAL WITH MEANS FOR WIRELESSLY ESTABLISHING SECURE PRIVATE LINK WITH EXTERNAL TERMINAL

(75) Inventors: Toshiyasu Nakao, Tokyo (JP); Atsushi Kashitani, Tokyo (JP); Keisuke Hayakawa, Tokyo (JP); Mie Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1552 days.

(21) Appl. No.: 10/460,162

(22) Filed: Jun. 13, 2003

(65) Prior Publication Data

US 2003/0231611 A1    Dec. 18, 2003

(30) Foreign Application Priority Data

Jun. 14, 2002   (JP) .............................. 2002-173672

(51) Int. Cl.
   *H04W 4/00* (2009.01)
(52) U.S. Cl. ...................................................... 370/338
(58) Field of Classification Search .............. 455/151.2, 455/410, 411, 41.2; 370/318, 328, 329, 332, 370/334, 338, 341, 349
   See application file for complete search history.

(56) References Cited

U.S. PATENT DOCUMENTS

| | | | |
|---|---|---|---|
| 5,268,933 A * | 12/1993 | Averbuch | 375/356 |
| 5,297,144 A * | 3/1994 | Gilbert et al. | 370/346 |
| 5,519,706 A * | 5/1996 | Bantz et al. | 455/435.2 |
| 5,754,961 A * | 5/1998 | Serizawa et al. | 455/517 |
| 5,930,368 A | 7/1999 | Hocker et al. | |
| 6,064,502 A * | 5/2000 | Burns et al. | 398/129 |
| 6,067,076 A | 5/2000 | Hocker et al. | |
| 6,072,468 A | 6/2000 | Hocker et al. | |
| 6,729,726 B2 * | 5/2004 | Miller et al. | 351/158 |
| 6,968,179 B1 * | 11/2005 | De Vries | 455/414.1 |
| 7,086,005 B1 * | 8/2006 | Matsuda | 715/706 |
| 7,174,130 B2 * | 2/2007 | Kurisko et al. | 455/41.2 |
| 2002/0045454 A1 | 4/2002 | Iwata | |
| 2002/0123325 A1 * | 9/2002 | Cooper | 455/411 |
| 2003/0021262 A1 * | 1/2003 | Ma et al. | 370/352 |
| 2006/0031457 A1 * | 2/2006 | Motoyama | 709/224 |

FOREIGN PATENT DOCUMENTS

| | | |
|---|---|---|
| JP | 11-150547 | 6/1999 |
| JP | 2001-238268 A | 8/2001 |
| JP | 2002-125268 | 4/2002 |
| JP | 2002-152309 A | 5/2002 |

\* cited by examiner

*Primary Examiner*—Kwang B Yao
*Assistant Examiner*—Alex Skripnikov
(74) *Attorney, Agent, or Firm*—Foley & Lardner LLP

(57) ABSTRACT

In a communications network where first and second communication terminals are interconnected via a common communication medium such as a local area network, the terminals jointly establish an infrared light private communication link if they are brought close to each other. The first and second terminals communicate their network addresses to each other either via the local area network or via the private communication link, and establish a session between the communicated network addresses via the local area network if the strength of the infrared-light private communication link at the receiving end is higher than a decision threshold.

37 Claims, 38 Drawing Sheets

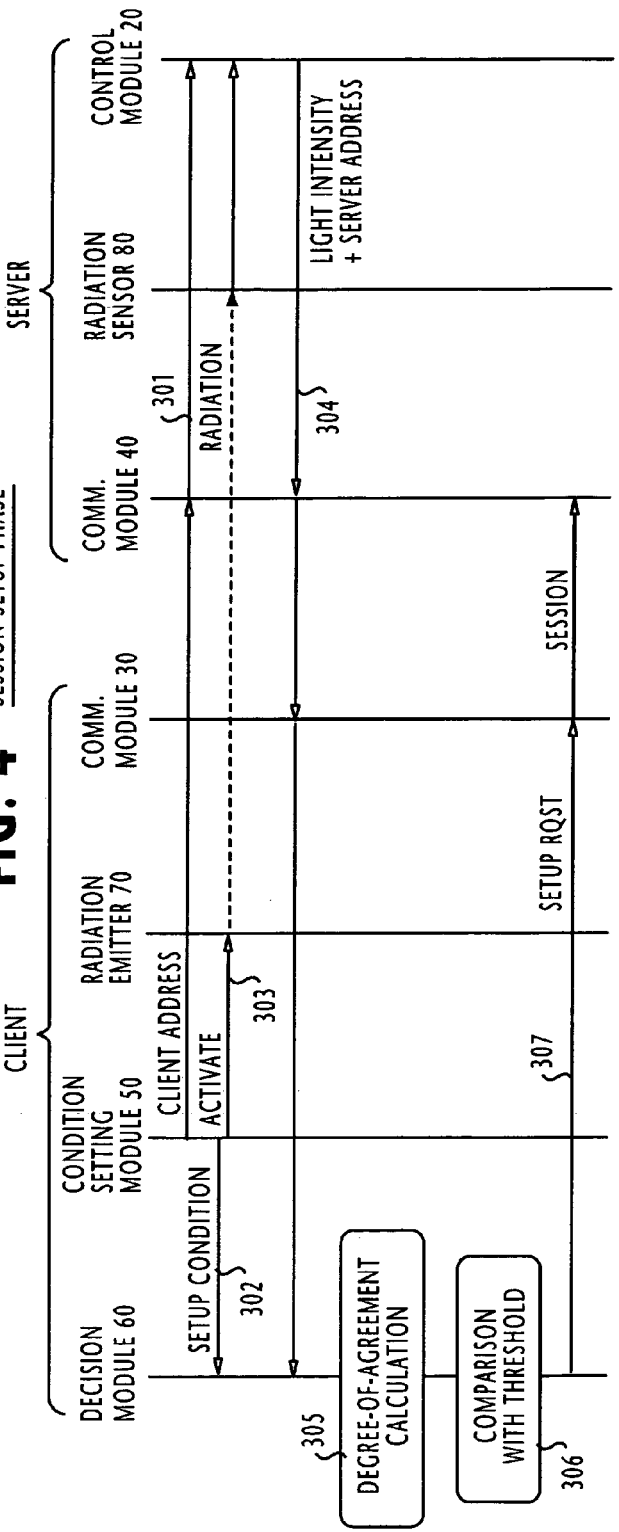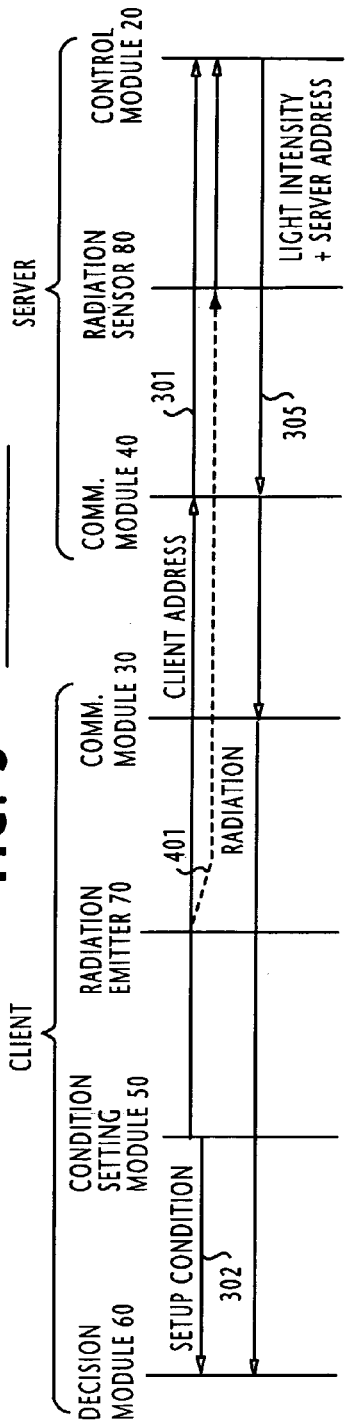

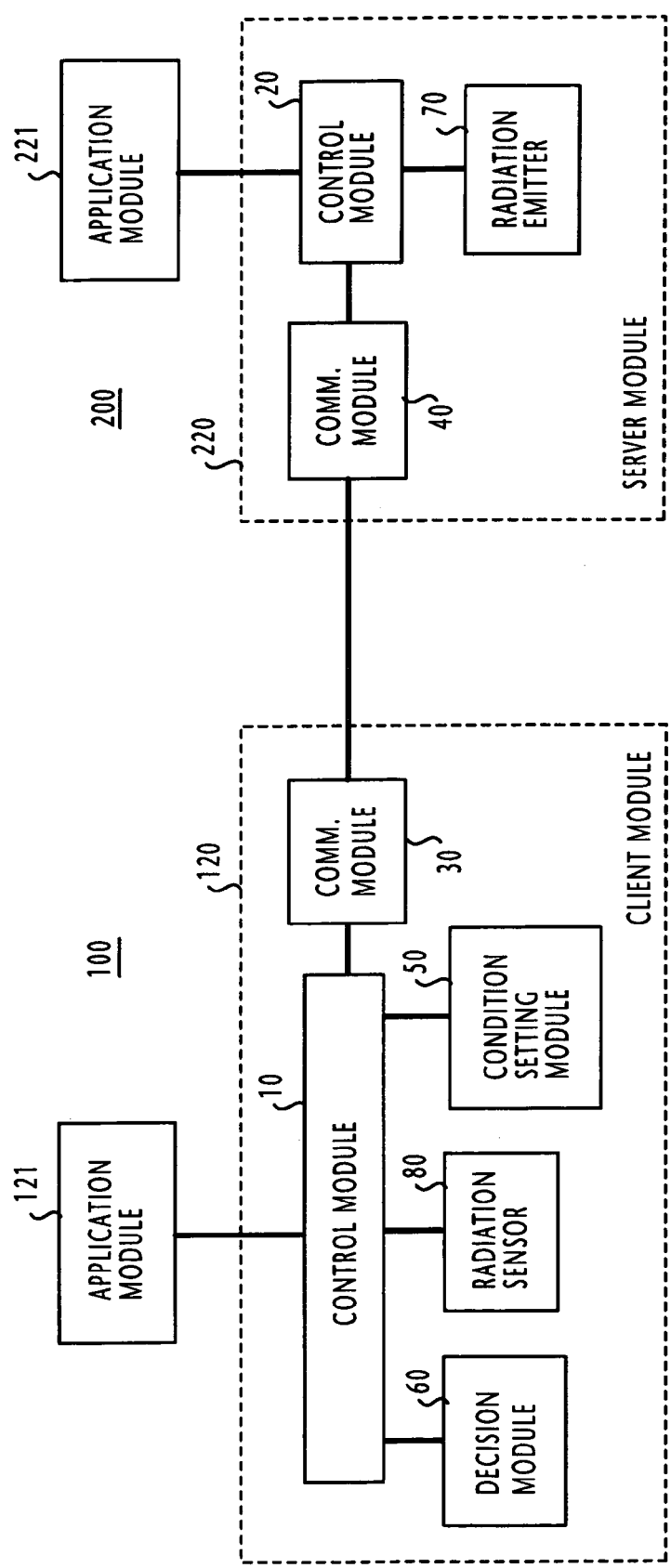

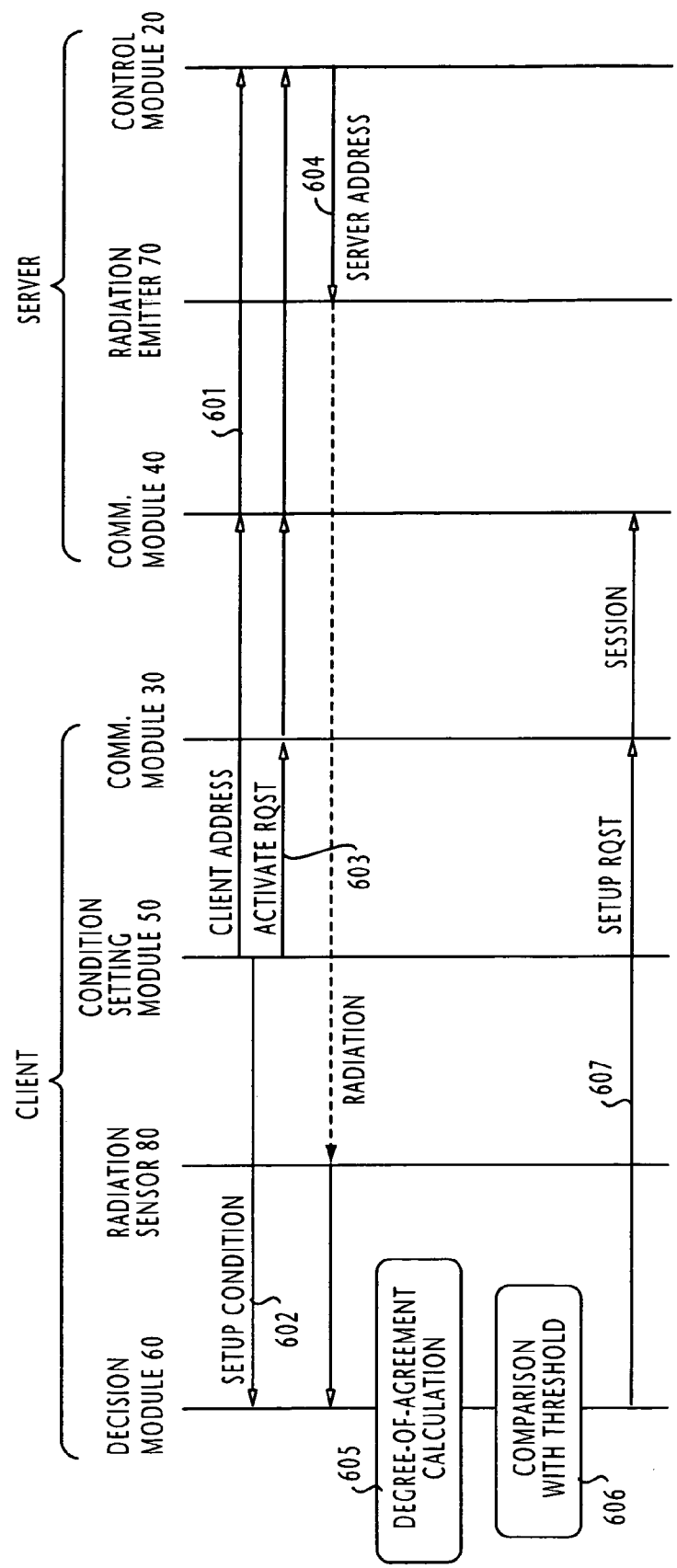

SESSION SETUP PHASE

SESSION SETUP PHASE

NETWORK TERMINAL WITH MEANS FOR WIRELESSLY ESTABLISHING SECURE PRIVATE LINK WITH EXTERNAL TERMINAL

BACKGROUND OF THE INVENTION

1. Field of the Invention

The present invention relates generally to communications technology for interconnecting data processing terminals including personal computers and mobile data terminals, and more specifically to a technique for establishing a session between such terminals in a client-server relationship when a predetermined mutual proximity is satisfied.

2. Description of the Related Art

While data communications technology has evolved from long-haul peer-to-peer connections and progressed through LAN and WAN to the recent internet connections, study has recently been focused on a technology for establishing secure connections between data terminals mutually located at close range. Because of the increasing importance of security, this technology will open up ways for developing a wide range of future applications. Typical examples of the prior art technology for establishing close-range connections involve the use of a wireless medium such as an infrared light beam of high directivity and weak electromagnetic radiation, as disclosed in Japanese Patent Publication 1999-150547. However, if it is desired to ensure high transmission speed, each communications terminal must be equipped with a high-precision, low-power wireless transceiver. Since the high-precision RF (radio frequency) transceivers represent a significant amount of expenditure, this prior art is disadvantageous for a local area network if the user desires to additionally establish an individual wireless link between a mobile terminal and a nearby LAN terminal. Furthermore, due to the characteristics of the high-precision transceiver, difficulty will be experienced when installing a radio transceiver on each LAN terminal.

Japanese Patent Publication 2002-125268 discloses a technique in which infrared communication is used to identify each communication terminal and a session (link) is established through a Bluetooth wireless network between terminals by using their identifiers. Since the infrared communication is only required to acquire a terminal identifier from a nearby terminal, a simple low-cost infrared transmitter may be sufficient. However, once a mobile terminal has acquired a terminal identifier from a nearby network terminal, a session can be established between them through the Bluetooth network even though they are separated significantly from each other in so far as their distance is in the communication range (10 to 100 meters). This is disadvantageous for applications where secure communication is important.

SUMMARY OF THE INVENTION

It is therefore an object of the present invention to enable the establishment of a secure connection via a common communication medium such as a local area network between closely spaced apart communication terminals depending on the strength of radiant energy at a receiving end of a private communication link established between the terminals.

According to a first aspect of the present invention, there is provided a communication system comprising a common communication medium, first and second communication terminals connected to the common communication medium, the terminals respectively having first and second network addresses. The first communication terminal includes an emitter for emitting a signal in space and the second communication terminal includes a sensor for detecting the signal from the emitter. One of the first and second communication terminals includes means for making a comparison between the output of the sensor and a decision threshold and establishes a session via the common communication medium between the first and second network addresses depending on a result of the comparison. The signal from the emitter may be either in the form of radiant energy (optical and electromagnetic energy) or in the form of acoustic energy.

According to a second aspect, the present invention provides a communication system comprising a common communication medium, first and second communication terminals, connected to the common communication medium, for jointly wirelessly establishing a private communication link therebetween, the first and second communication terminals having first and second network addresses, respectively. One of the first and second communication terminals includes means for making a comparison between strength of the private communication link at one of the terminals and a decision threshold and establishing a session via the common communication medium between the first and second network addresses depending on a result of the comparison.

According to a third aspect, the present invention provides a communication terminal for a communications network in which the communication terminal establishes communication with a second communication terminal via a common communication medium, wherein the communication terminal and the second communication terminal are uniquely identified by a network address. The communication terminal of the present invention comprises means for jointly wirelessly establishing a private communication link with the second communication terminal if both terminals are brought close to each other, means for communicating their network addresses to each other either via the common communication medium or the private communication link, and means for establishing a session between the communicated network addresses via the common communication medium if the strength of the private communication link at its receiving end is higher than a decision threshold.

BRIEF DESCRIPTION OF THE DRAWINGS

The present invention will be described in detail further with reference to the following drawings, in which:

FIG. 4 is a sequence diagram of a session setup operation of the network of FIG. 3;

FIG. 5 is a modified sequence diagram of FIG. 4;

FIG. 10 is a block diagram of the client-server communication network according to a second form of the first embodiment of this invention;

FIG. 11 is a sequence diagram of a session setup operation of the network of FIG. 10;

DETAILED DESCRIPTION

Figure 1:
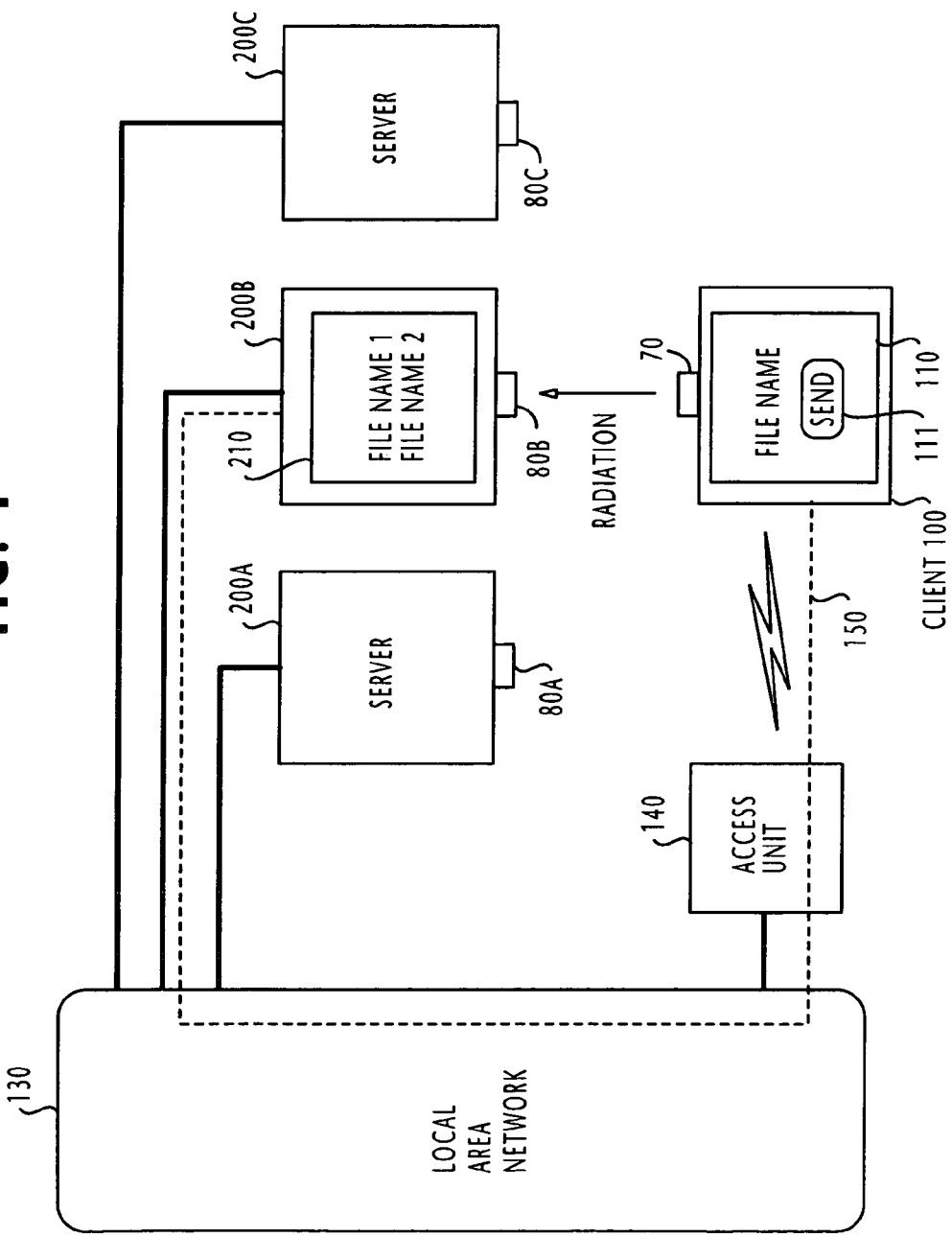
FIG. 1 is a block diagram of a communications network which is suitable for application to the first embodiment of the present invention.

Referring to FIG. 1, there is shown a communications network which is suitable for implementing the first embodiment of the present invention. The network comprises a plurality of server terminals 200A, 200B and 200C, all of which are connected to a local area network 130. A wireless access unit 140 is also connected to the local area network to establish a wireless link to the mobile client terminal 100, which is located close to the server terminal 200B, for example. Therefore, the client terminal 100 is also connected to the LAN 130. Client terminal 100 is now conditioned to establish a logical link, or session to any of the server terminals. If the client terminal 100 is positioned close to the server terminal 200B, as illustrated, a session 150 can be established to it through the LAN 130.

Client terminal 100 is provided with a radiation emitter 70 for producing a beam of infrared light of a predetermined intensity and each server terminal 200 has a radiation sensor 80 for receiving infrared light and producing a signal indicating the radiation intensity of the received light. In this way, the client and server terminals jointly establish a secure private communication link using radiant energy emitted from the radiation emitter 70 to radiation sensor 80. Alternatively, visible light, weak electromagnetic energy or acoustic energy can also be used, instead of infrared light to establish the private communication link.

After a session is established each server terminal 200 serves the associated client terminal 100 by receiving a data file and storing it in a storage device or medium. When the client terminal is being serviced, a file name of the received data file is displayed on the screen of the server terminal 200B as indicated in a window 210. The application layer module of client terminal 100 allows the user to specify a desired file name on its user interface 110 and transmit the specified data file to the server terminal by touching a "SEND" button 111 on the screen of the user interface. The application layer module of client terminal 100 uses file transfer protocol (FTP) to transmit a data file to the associated server terminal 200.

Before transmitting a data file, the user of client terminal 100 first selects one of the server terminals by pointing its infrared beam to the radiation sensor 80 of the selected server and then pressing the "SEND" button 111, instead of the conventional tedious and time-consuming task of finding the network address of the desired server terminal from a list of many network addresses and entering it to the client terminal.

Figure 2:
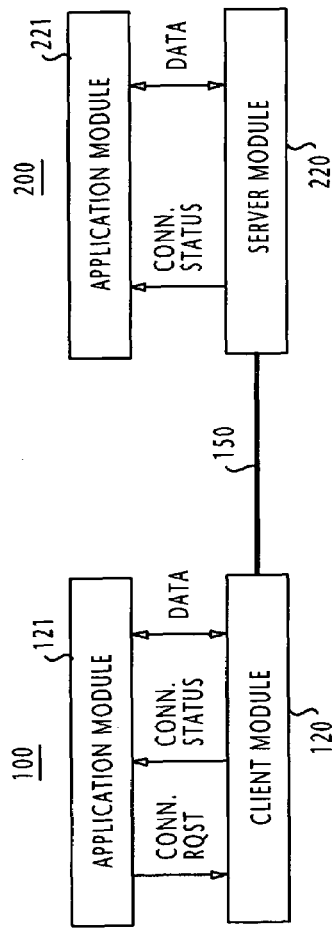
FIG. 2 is a block diagram of a client terminal and a server terminal of the present invention.

FIG. 2 illustrates details of the client terminal and each server terminal. Client terminal 100 includes a client module 120 which is connected to an application module 121. Application module 121 sends a connection request and client data to the client module 120 and receives connection status and server data to the application module 121. Each server terminal 200 includes a server module 220 and an application module 221. Server module 220 receives server data from the application module 221 and transmits connection status and client data to the application module 221.

Client module 120 and the server module 220 is interconnected through the LAN 130 to establish a session between the client application module 121 and the server application module 221 in response to a connection request from the client application module 121 to exchange data. The session is released in response to a disconnect request from the client application module 121.

Figure 3:
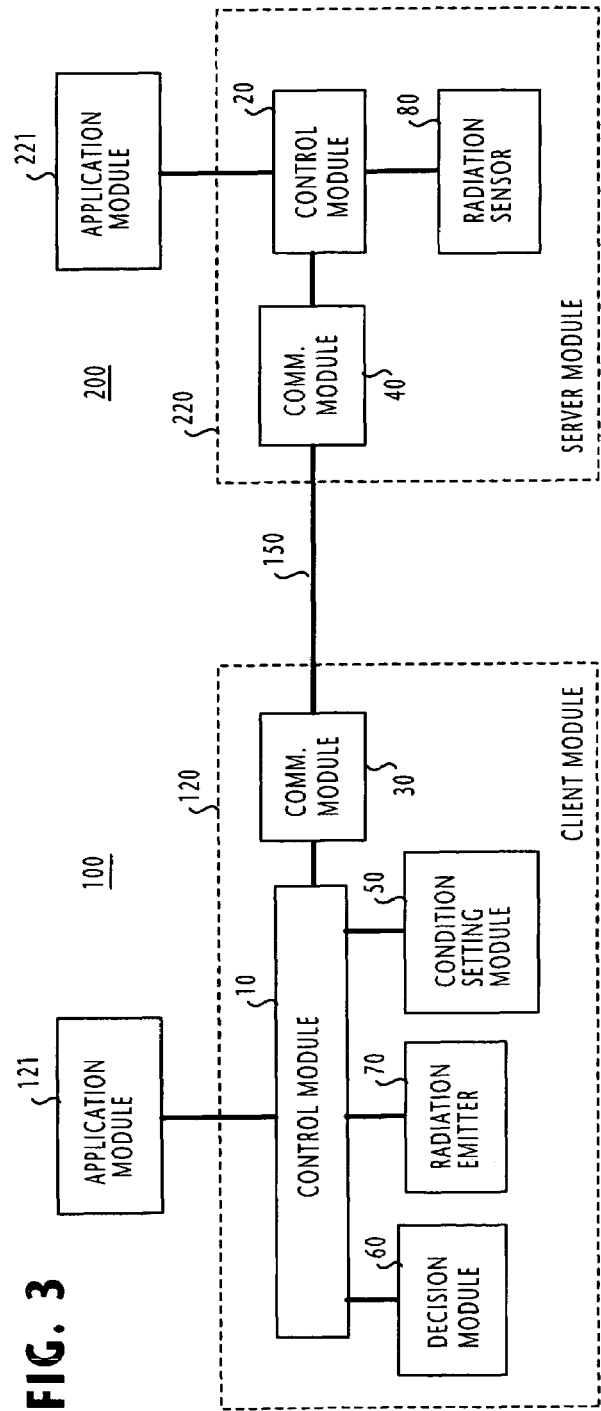
FIG. 3 is a block diagram of the client-server communication network according to a first form of the first embodiment of this invention.

FIG. 3 shows details of the client module 120 and the server module 220 according to the first embodiment of the present invention. In the first embodiment, the client terminal 100 is responsible for making a decision as to whether or not a session is to be established to the server terminals. Client module 120 includes a control module 10, connected to the application module 121, for performing overall control over all elements of the client module 120, a communication module 30 for establishing a physical-layer link with a communication module 40 of the server module 220. Server module 220 includes a control module 20 which performs overall control on all elements of server module 220. Radiation emitter 70 is connected to the control module 10.

In the client module, a condition setting module 50 is connected to the control module 10 to respond to a connection request from the client application module 121 for generating a reference condition which must be met by the client terminal before a session is established between the two communications terminals. Client module 120 further includes a decision module 60, which is connected to the control module 10, to receive a response from the server terminal for making a decision as to whether the session setup condition is satisfied. Radiation emitter 70 is activated in response to a command signal from the condition setting module 50 to emanate an infrared beam of predetermined intensity. The beam is pointed by the user to the radiation sensor, or photodiode 80 of the server terminal 200.

In the server terminal, the output of the radiation sensor 80 is applied to the control module 20 where it is converted to a digital signal representing the received radiation intensity. The network address of the server terminal is combined with the digital intensity signal and transmitted to the client terminal 100. Client's decision module 60 receives the digital intensity signal and calculates its degree of agreement to a decision threshold and compares it with a predetermined value. The decision threshold is set by the condition setting module 50.

More specifically, the decision module 60 calculates the degree of agreement (DOA) value of the sensor signal by reading it as a distance between the emitter 70 and the sensor 80 and dividing the distance by a reference distance represented by the decision threshold to produce a quotient and then compares the quotient with a predetermined value. Depending on a result of the comparison, a decision is made as to whether or not a session is established between the client terminal 100 and the server terminal 200.

In a simple, yet effective method, when the output signal of the sensor 80 is "1", the degree of agreement of the sensor signal is "1" and permission is granted to the request from the client terminal to establish a session to the associated server terminal. When the output signal of the sensor 80 is "0", the degree of agreement of the sensor signal is "0" and permission is not granted to the client's request.

In a precision method, the control module 20 produces a digital signal representing the intensity of light detected by the sensor 80. Since the detected light intensity varies inversely with a distance between the client and server, the degree-of-agreement of the digital signal is calculated by dividing the distance indicated by the digital sensor signal by the decision threshold. For example, if the digital sensor signal indicates a distance of 25 centimeters and the decision threshold is set equal to 50 centimeters, the degree of agreement of the sensor signal to the decision threshold is equal to 2(=50/25). The calculated DOA value is compared with a predetermined value "1". Since the DOA value is greater than the predetermined value, permission is granted to the client terminal to establish a session to the server terminal.

According to a first form of the first embodiment, the operation of the communications network proceeds as shown in FIG. 4.

When the client terminal 100 receives a connection request from its application module, the condition setting module 50 sends a broadcast packet to the LAN 300 containing the network address of the client terminal for requesting the establishment of a session (event 301). All server terminals 200 are thus informed of the network address of the client terminal.

In response to the connection request, the condition setting module 50 generates a session setup reference condition (i.e., decision threshold) and supplies it to the decision module 60 (event 302) and activates the radiation emitter 70 to produce an infrared-light beam (event 303). If the beam is directed to the radiation sensor 80 of a selected server terminal, the sensor produces an output signal which is converted by the control module 20 to a digital signal indicating the intensity of the received infrared light. Control module 20 combines the digital signal with the network address of the server terminal and formulates a packet with a header containing the received client network address and encapsulates the combined signal into the payload field of the packet. The packet is transmitted from the server as an output of the radiation sensor 80 to the client's decision module 60 through the communication module 40, the LAN 130 and the communication module 30 (event 304). Decision module 60 calculates the degree-of-agreement value of the received digital intensity signal to a decision threshold (event 305) and compares the DOA value with a predetermined value (event 306). If the calculated degree-of-agreement value is equal to or higher than a predetermined value, the decision module 60 formulates a session request message containing the received network address of the server terminal and transmits the message to the LAN 130 through tile communication module 30 (event 307).

As shown in FIG. 5, the radiation emitter 70 may be activated simultaneously with the transmission of the client network address to the server terminal (event 401), instead of responding to the command signal from the condition setting module 50.

Figure 6:
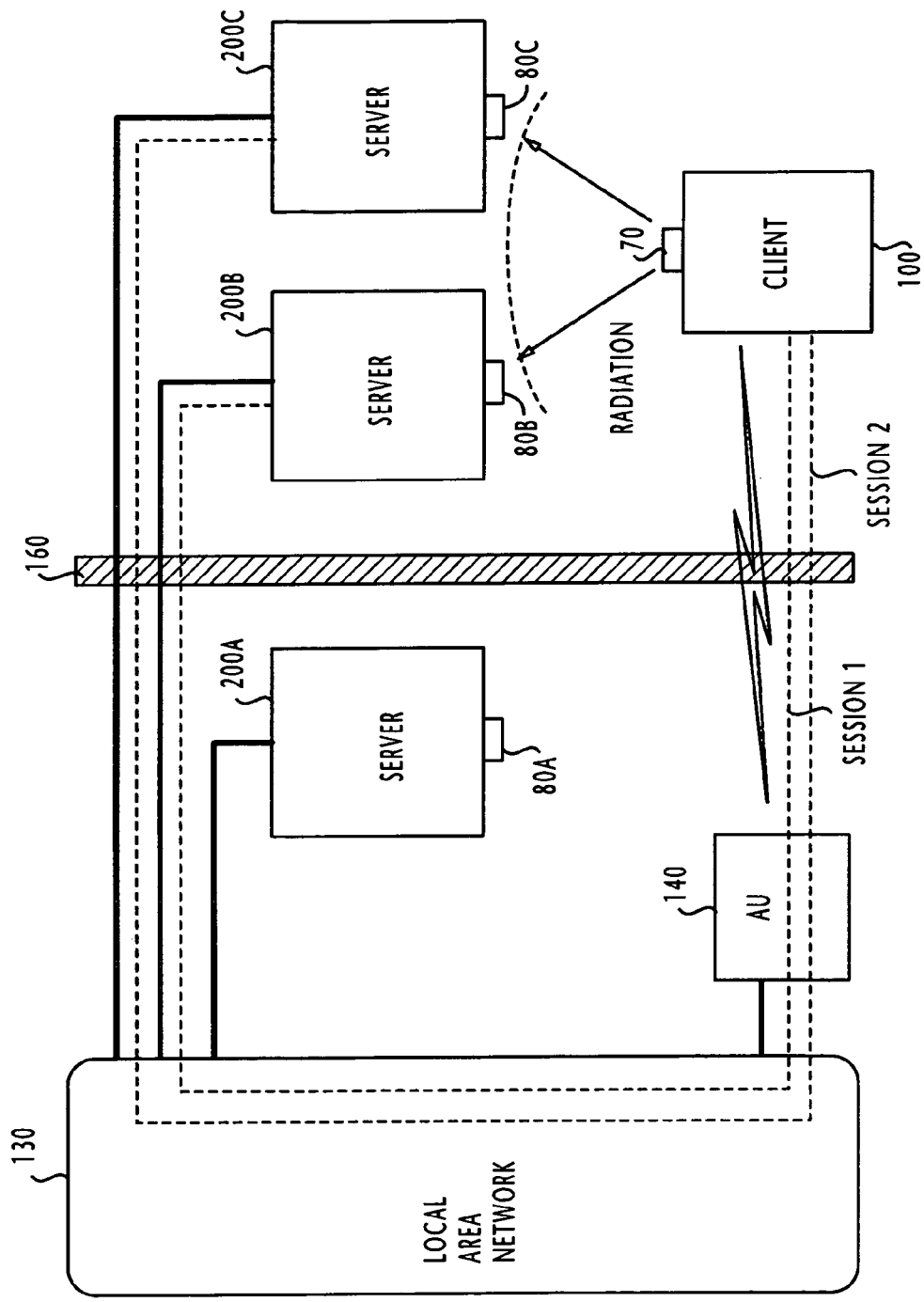
FIG. 6 is a block diagram of a client-server communication network of the first embodiment in which a wide beam of infrared light is used to establish a number of sessions with multiple server terminals.

The communications network of the first embodiment of this invention can be configured as shown in FIG. 6 in which the server terminals 200B and 200C are separated from the server terminal 200A by a wall 160 and the radiation emitter 70 of client terminal 100 emits a wide beam of infrared radiation so that it covers an area in which the radiation sensors 80B and 80C are located. By the presence of wall 160, the infrared light beam is prevented from reaching the radiation sensor 80A. In this network, the client terminal 100 communicates with the wireless access unit 140 through the wall 160 and emits the wide radiation beam to the server terminals 200B and 200C. Client terminal 100 performs the previously described operation of FIG. 4 or 5 to establish a session 1 to the server terminal 200B and repeats a similar operation to establish a second session 2 to the server terminal 200C. In this way, the client terminal is able to establish a number of sessions with the server terminals located within the same room for simultaneously transmitting data files.

Figure 7:
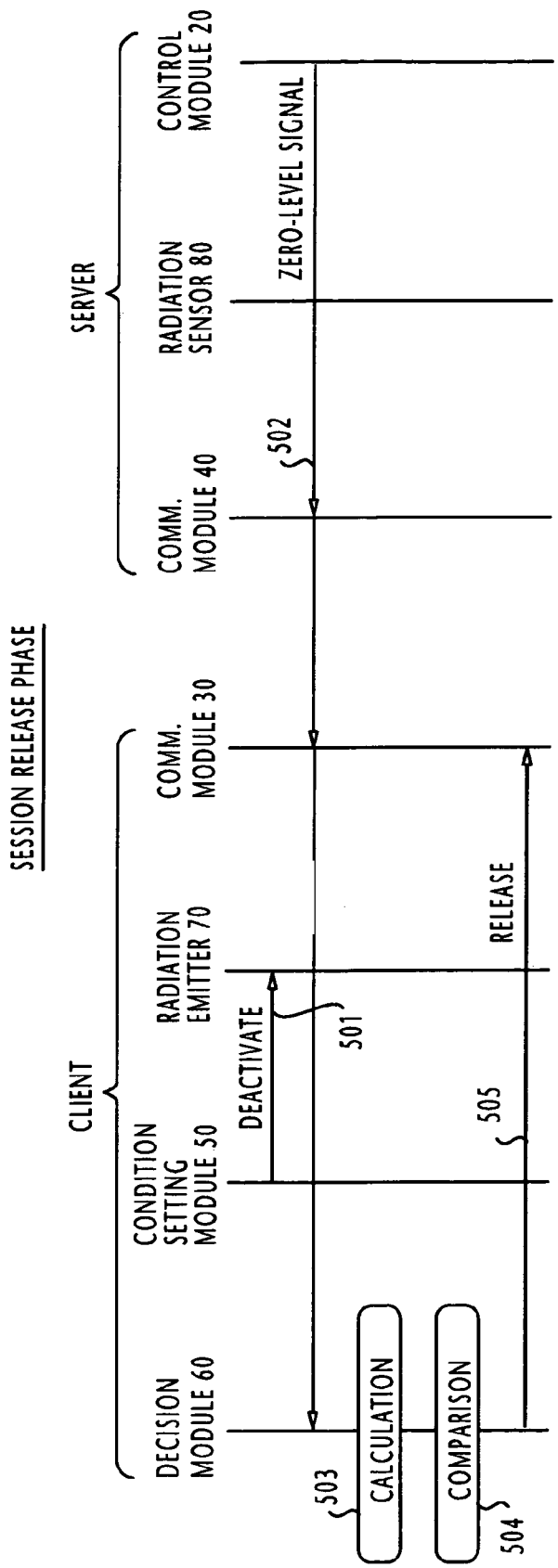
FIG. 7 is a sequence diagram of a session release operation of the client-server network of the present invention.

The established session is released in a manner as illustrated in FIG. 7. Following the transmission of a data file to the associated server terminal, the application module of the client terminal 100 requests the client module to release the established session. In response to this request, the condition setting module 50 deactivates the radiation emitter 70 (event 501). Due to the extinction of the infrared radiation, the server control module 20 transmits a zero-level signal (event 502) to the client terminal. In response, the decision module 60 calculates the degree-of-agreement of the received zero-level signal and produces an output indicating that the degree of agreement is zero (event 503). Decision module 60 compares this zero degree value with the decision threshold (event 504) and produces a signal indicating that the session is not granted. This signal is transmitted to the communication module 30 as a release command signal to disconnect the session (event 505).

Figure 8:
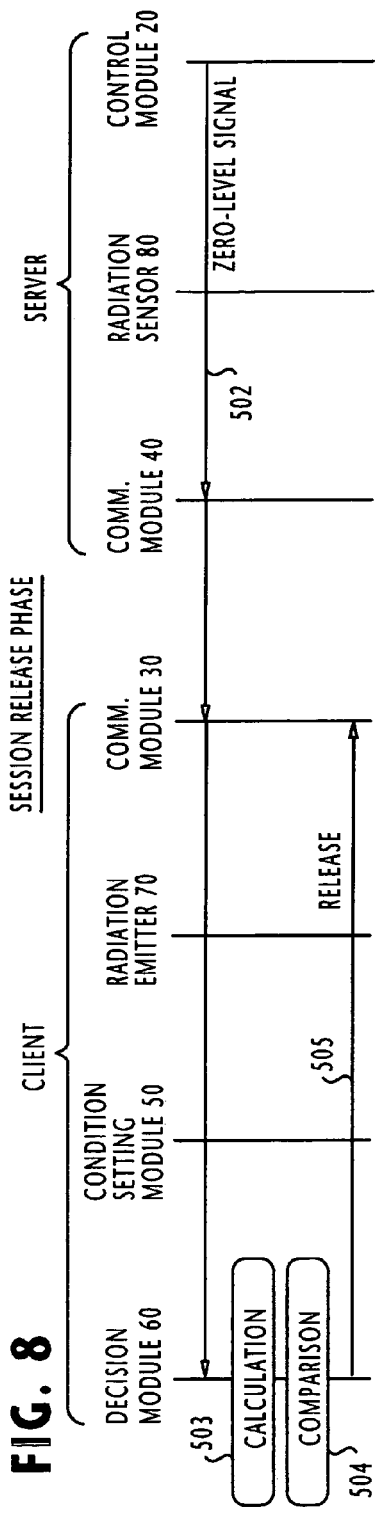
FIG. 8 is a modified sequence diagram of FIG. 7.

Instead of the client application module issuing a session release request to the client module, an established session is released by simply moving the client terminal 100 away from the associated server terminal 200B, as illustrated in FIG. 8. In this case, a zero-level signal is automatically transmitted from the server control module 20 to the client terminal (event 502), which eventually results in the clear-down of an established session (events 503, 504, 505).

Figure 9A:
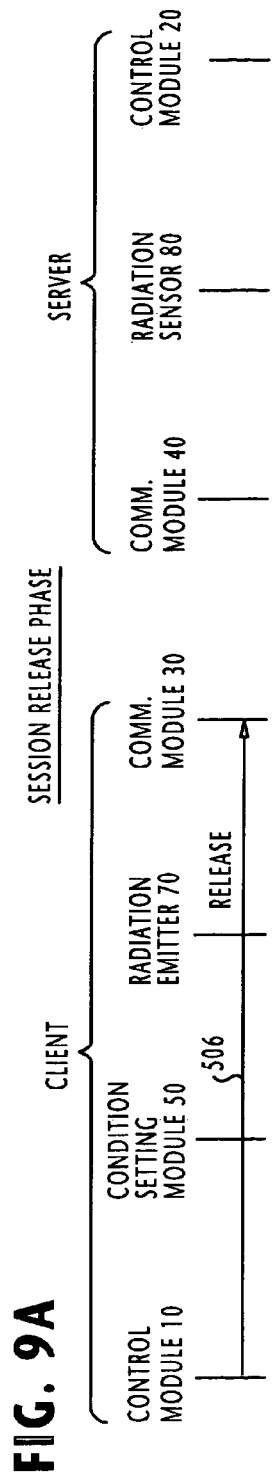
FIGS. 9A and 9B are modified sequence diagrams of FIG. 7.
Figure 9B:
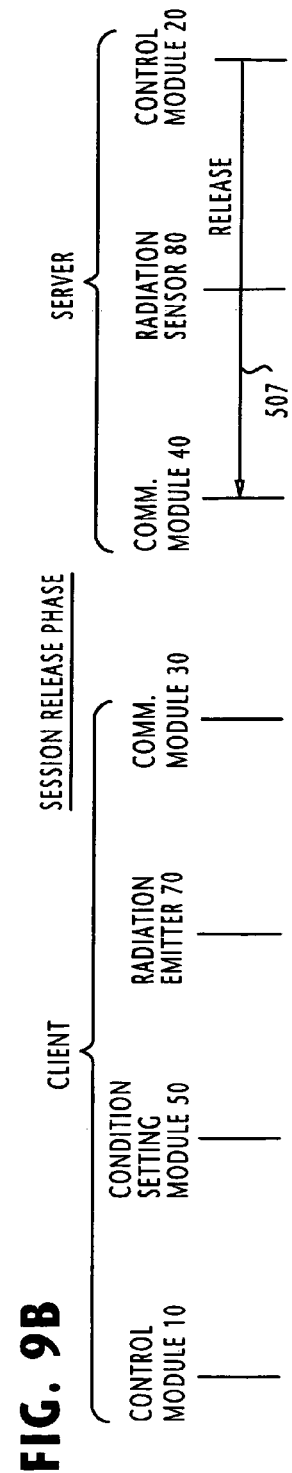

Instead of using the session release mechanism (events 501 to 505), the network may be configured so that a session once established is maintained until the transfer of a data file is completed even though the client terminal 100A is removed from the server terminal 200B out of the detection range of the sensor 80. In this case, an instruction is sent from the client's application module to the control module 10 when a data file has been transmitted. In response to this instruction, the control module 10 issues a session release command (event 506) to the communication module 30 as shown in FIG. 9A. Alternatively, when the data file has been transmitted, an instruction is sent from the server's application module to the control module 20, which responds by issuing a session release request message (event 507) to the communication module 40 as shown in FIG. 9B.

A second form of the first embodiment of the invention is shown in FIGS. 10 and 11. In this form of the invention, the radiation emitter 70 is installed on each of the server terminals 200 and the radiation sensor 80 is provided on the client terminal 100.

As shown in FIG. 11, the operation of this system starts with the client's condition setting module 50 transmitting a broadcast packet to the LAN 130 (event 601) containing the client network address. Therefore, the control modules 20 of all server terminals 200 are notified of the client's network address. Condition setting module 50 supplies the session setup reference condition (i.e., decision threshold) to the decision module 60 (event 602) and sends a broadcast packet to the LAN 130 for requesting each server to activate the radiation emitter 70 (event 603). This broadcast packet is received by the control modules 20 of all server terminals. In response to this request packet, the control module 20 of each server terminal activates its own radiation emitter and applies to it the network address of the server (event 604). Therefore, the infrared light from the radiation emitter 70 is modulated with the server's network address and transmitted to the client terminal via the LAN 130. If the client terminal 100 is located close to one of the server terminals, the radiation sensor 80 detects the radiation of this server and supplies its output to the decision module 60 via the control module 10. Decision module 60 performs a degree-of-agreement calculation on the sensor output (event 605) and threshold comparison (event 606). If the degree of agreement exceeds a predetermined value, the decision module 60 sends a session setup request to the communication module 30 (event 607). This session setup request contains a header destined to the network address of the associated server transmitted by event 604.

Figure 12:
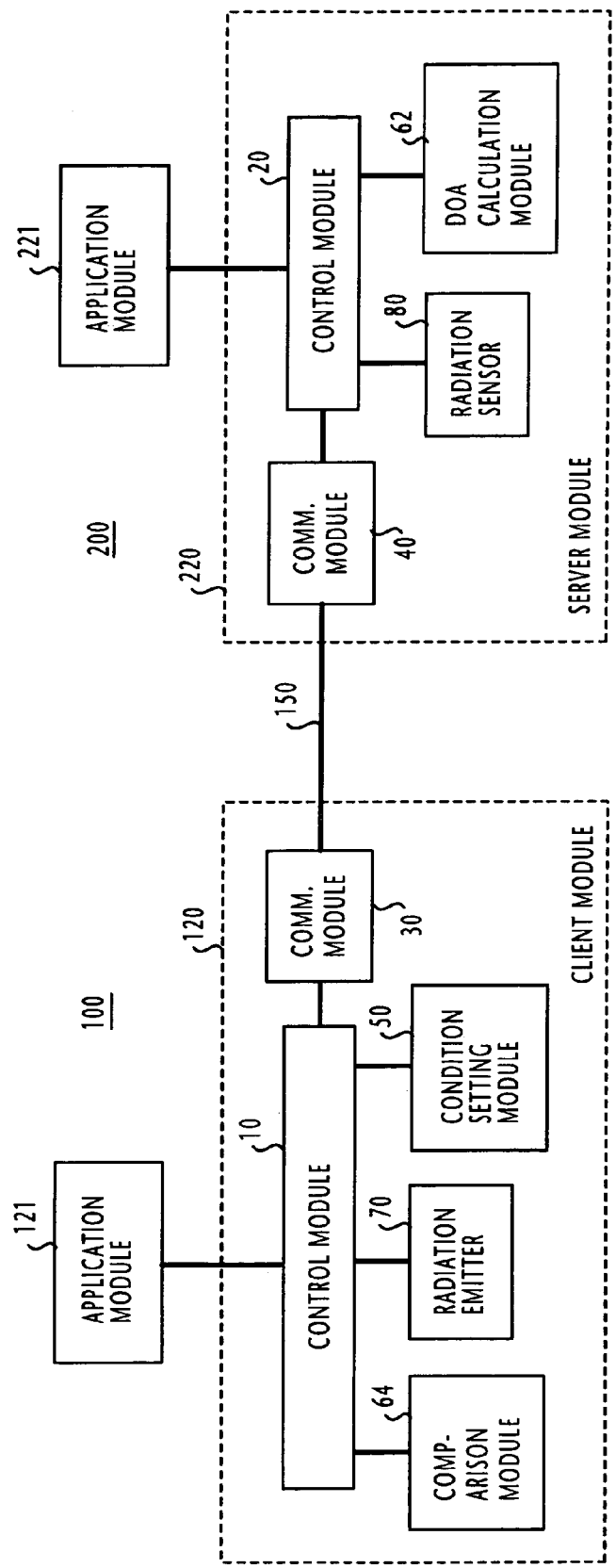
FIG. 12 is a block diagram of the client-server communication network according to a third form of the first embodiment of this invention.
Figure 13:
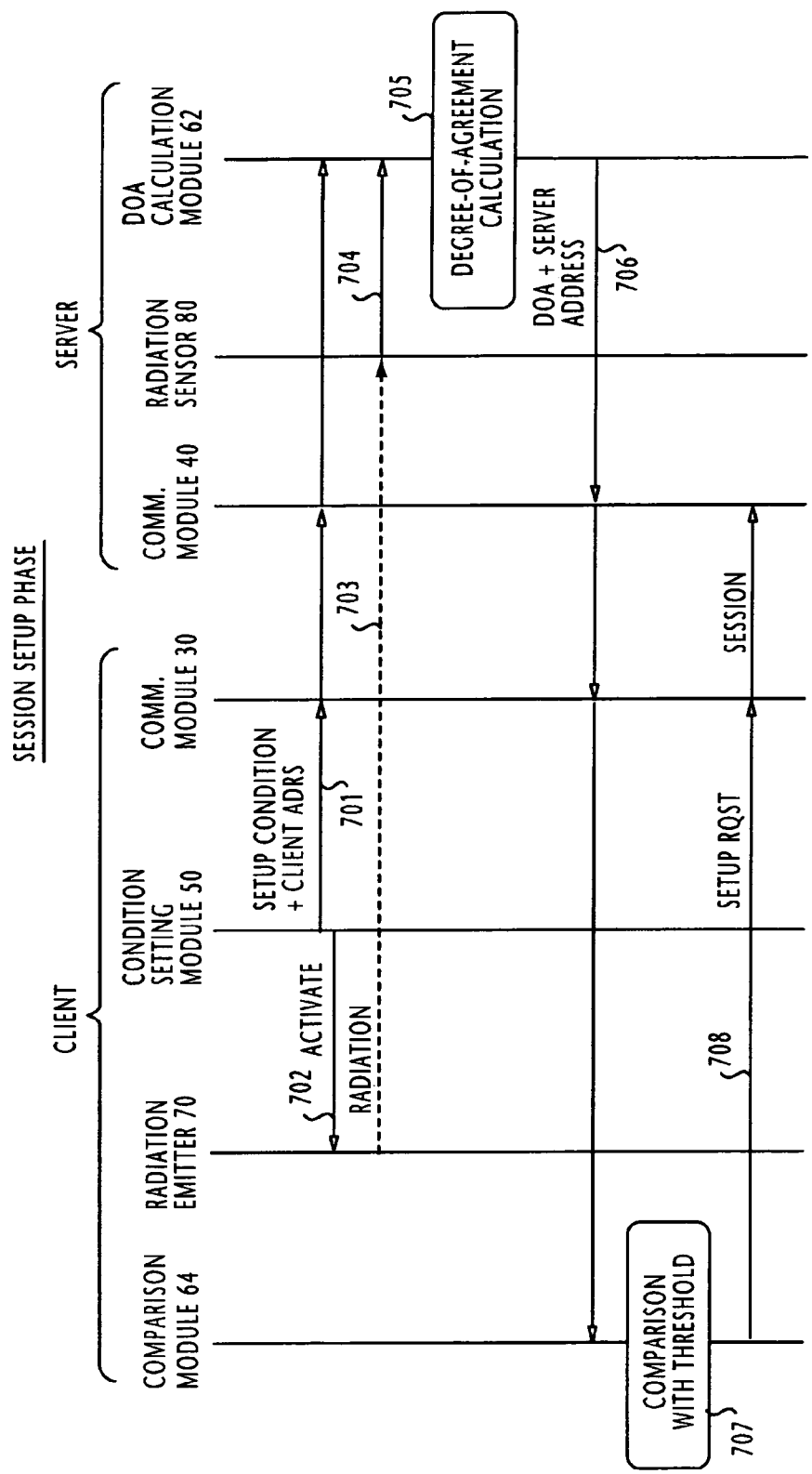
FIG. 13 is a sequence diagram of a session setup operation of the network of FIG. 12.

In FIGS. 12 and 13, a third form of the first embodiment is shown, which is similar to FIGS. 3 and 4, but differs in that the decision module of FIG. 3 is separated into a degree-of-agreement calculation module 62 and a comparison module 64, with the DOA calculation module 62 being installed on each server terminal and the comparison module 64 on the client terminal 100.

As shown in FIG. 13, the operation of the third form of the invention starts with the condition setting module 50 transmitting a broadcast packet containing a session setup reference condition (decision threshold) and the client network address to the LAN 130, which is received by the degree-of-agreement (DOA) calculation module 62 of each server terminal (event 701). Condition setting module 50 then activates the radiation emitter 70 (event 702). In response, the radiation emitter 70 emits an infrared light beam to one of the server terminals 200 (event 703). Radiation sensor 80 of this server terminal detects the infrared light beam and supplies a sensor output to the DOA calculation module 62 (event 704). The DOA calculation module 62 calculates the degree-of-agreement calculation of the sensor output (event 705) and transmits a message containing the calculated DOA value and the server's network address to the client terminal (event 706). On receiving this message, the comparison module 64 compares the DOA value with the decision threshold (event 707) and sends a session setup request to the communication module 30 to establish a session if the decision threshold is exceeded (event 708). Instead of transmitting the server's network address with the calculated DOA value, all server terminals may be configured so that they respond to the message of event 701 by returning their network addresses to the client terminal In this case, since the client terminal receives different DOA values from the servers, it can select a server having a DOA value that exceeds the decision threshold as a correct server terminal.

Figure 14:
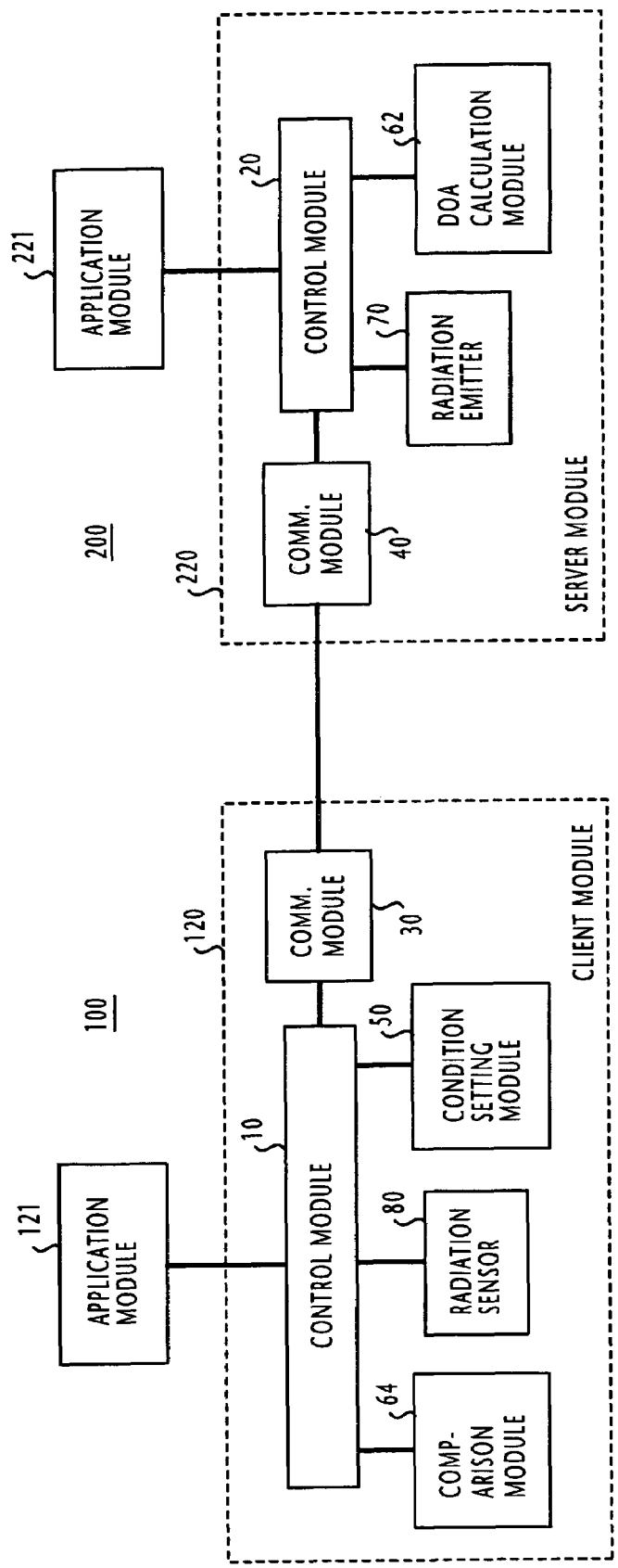
FIG. 14 is a block diagram of the client-server communication network according to a fourth form of the first embodiment of this invention.
Figure 15:
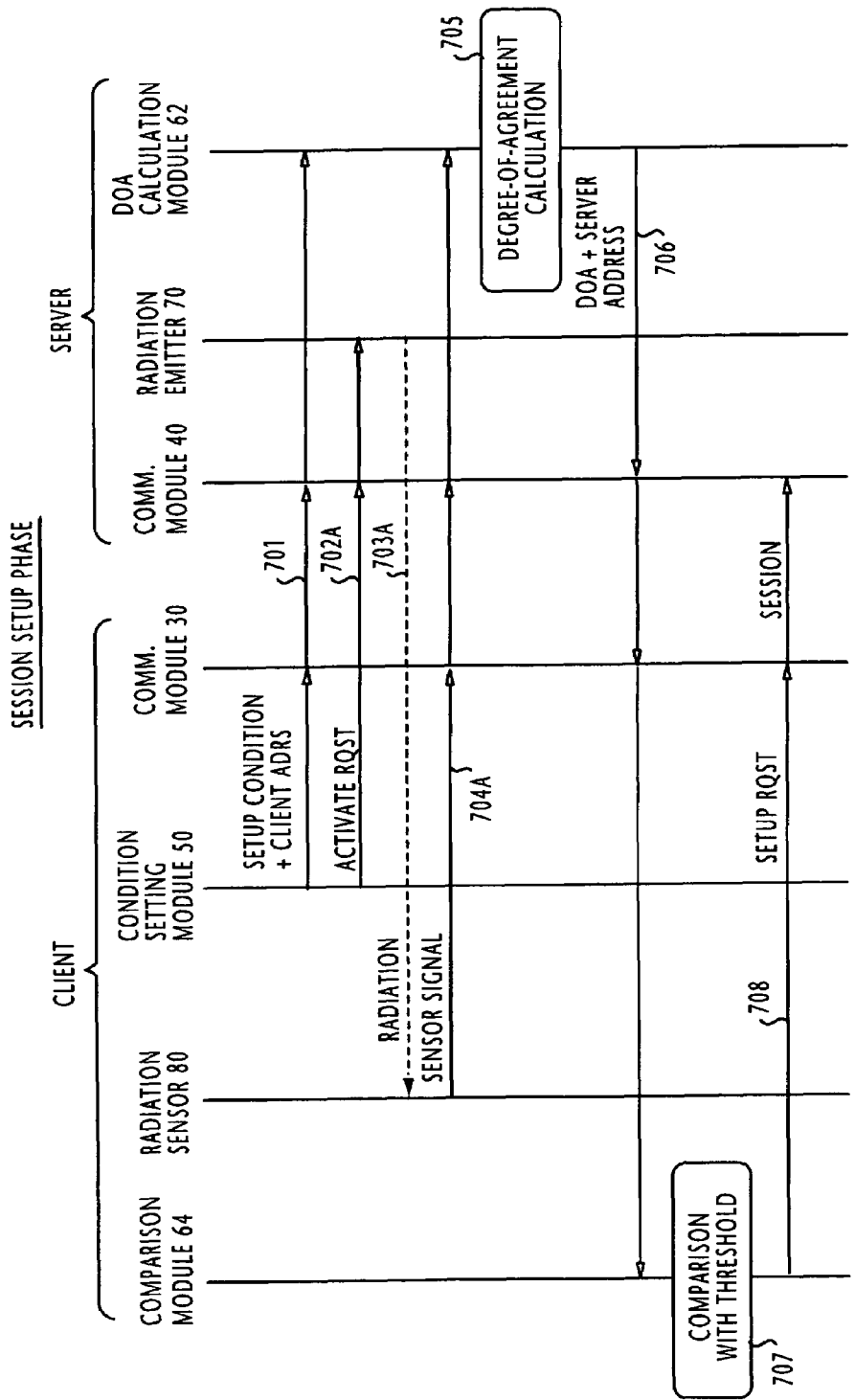
FIG. 15 is a sequence diagram of a session setup operation of the network of FIG. 14.

As a fourth form of the first embodiment of this invention, the communications network of FIGS. 12 and 13 is modified as shown in FIGS. 14 and 15. This modification differs from the third form of the first embodiment in that the radiation emitter 80 is installed on the client terminal 100 and the radiation sensor 70 is installed on each of the server terminals 200, as illustrated in FIG. 14, while the configuration of the client and server terminals is identical to that of the third form of the first embodiment.

As shown in FIG. 15, the operation of the network of FIG. 14 proceeds in a manner similar to that of FIG. 13 with the exception that the condition setting module 50 sends an emitter activate request message to the radiation emitter 70 via the communication modules 30 and 40 (event 702A). In response, the radiation emitter 70 of each server terminal emits an infrared light beam (event 703A). Radiation sensor 80 of the client terminal 100, if located closed to one of the server terminals, responds to this beam and generates a radiation intensity signal. This signal is transmitted through the communication modules 30, 40 to the DOA calculation module 62 (event 704A). Then, a sequence of events will follow in the same way as that of FIG. 13.

Figure 16:
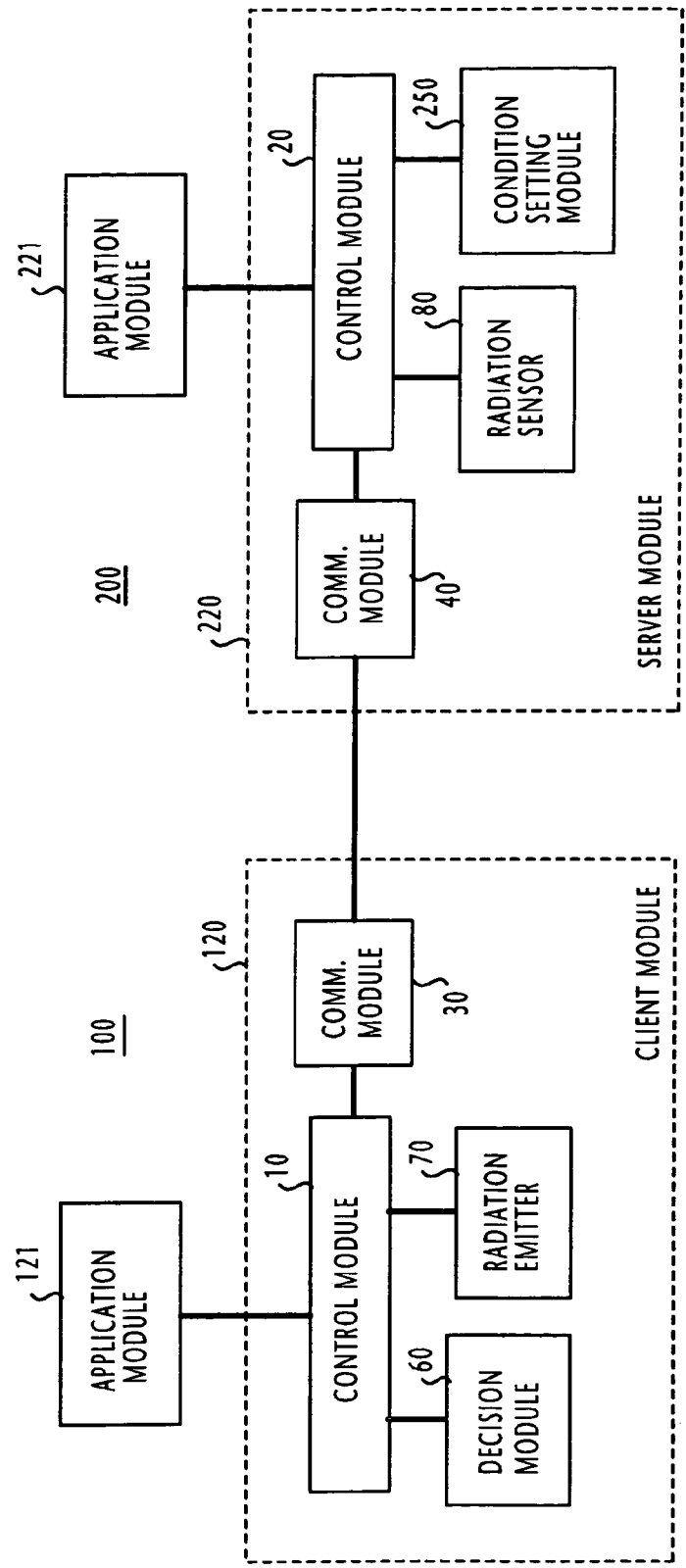
FIG. 16 is a block diagram of the client-server communication network according to a fifth form of the first embodiment of this invention.
Figure 17:
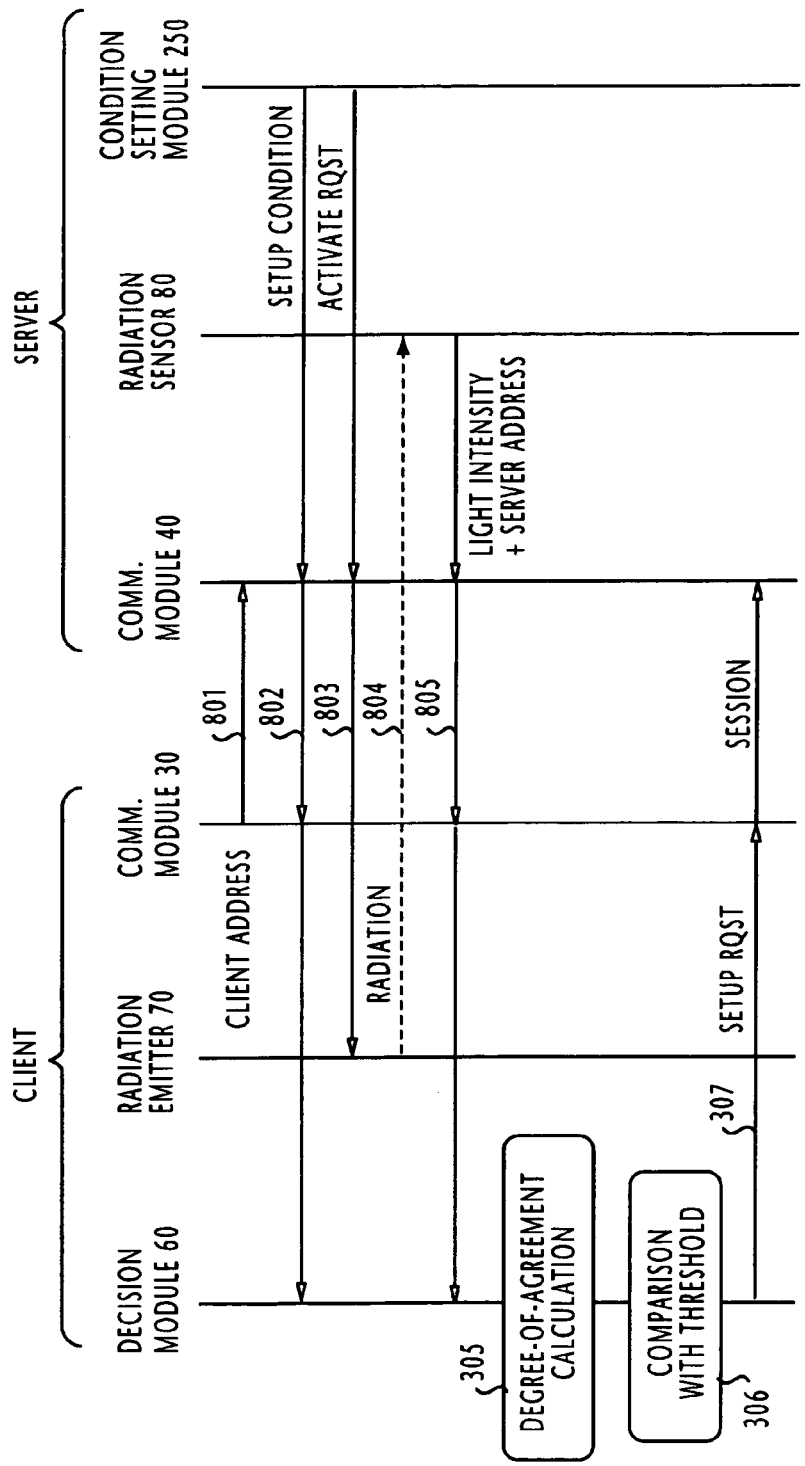
FIG. 17 is a sequence diagram of a session setup operation of the network of FIG. 16.

A fifth form of the first embodiment is shown in FIGS. 16 and 17, which differs from the first form of the first embodiment in that the condition setting module 50 is installed on each of the server terminals 200, instead of it being installed on the client terminal 100.

As shown in FIG. 17, the operation of the network of FIG. 16 starts with the client control module 10 transmitting a broadcast packet to the LAN 130 containing the client network address (event 801). In response to this broadcast packet, the control module 20 of each server terminal directs its condition setting module 50 to send a session setup reference condition (event 802) and an emitter activate request to the client terminal (event 803). From the nearest of the server terminals, the client decision module 60 receives the session setup reference condition (event 802). Client radiation emitter 70 is activated in response to the activate request (event 803) and emits an infrared light beam to the server radiation sensor 80 (event 804). Radiation sensor 80 supplies its output to the control module 20, where it is converted to a digital sensor signal. A message containing the digital sensor signal plus the server's network address is transmitted from the server as an output of the radiation sensor via the LAN 130 (event 805). Using the digital sensor signal, the decision module 60 hereinafter performs events 305 to 307 in the same manner as FIG. 4. Instead of transmitting the server's network address with the digital sensor signal, all server terminals may be configured so that they respond to the message of event 801 by returning their network addresses to the client terminal. Since the client terminal calculates different DOA values, it can select a server having a DOA value that exceeds the decision threshold as a correct server. Alternatively, the server's network address may be transmitted to the client terminal by encapsulating it in the emitter activate request (event 803).

Figure 18:
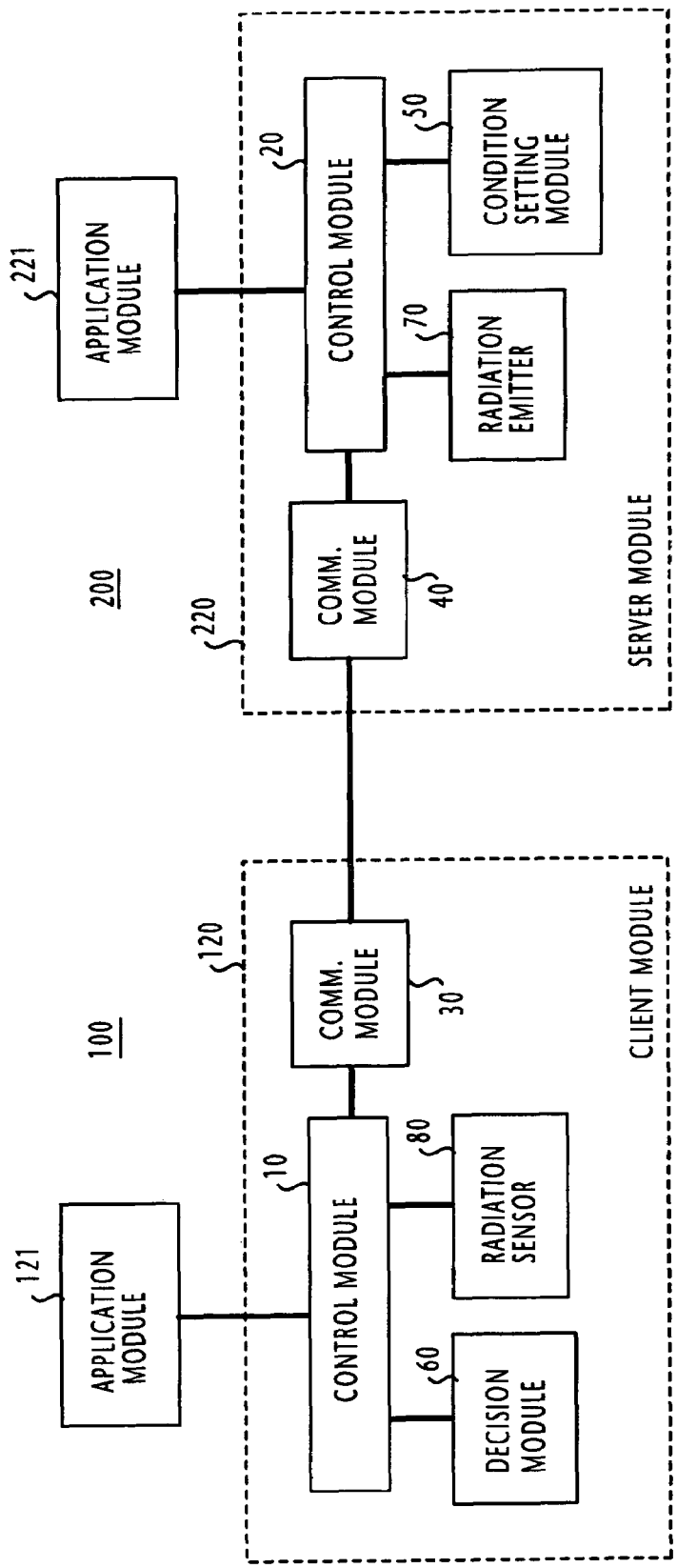
FIG. 18 is a block diagram of the client-server communication network according to a sixth form of the first embodiment of this invention.
Figure 19:
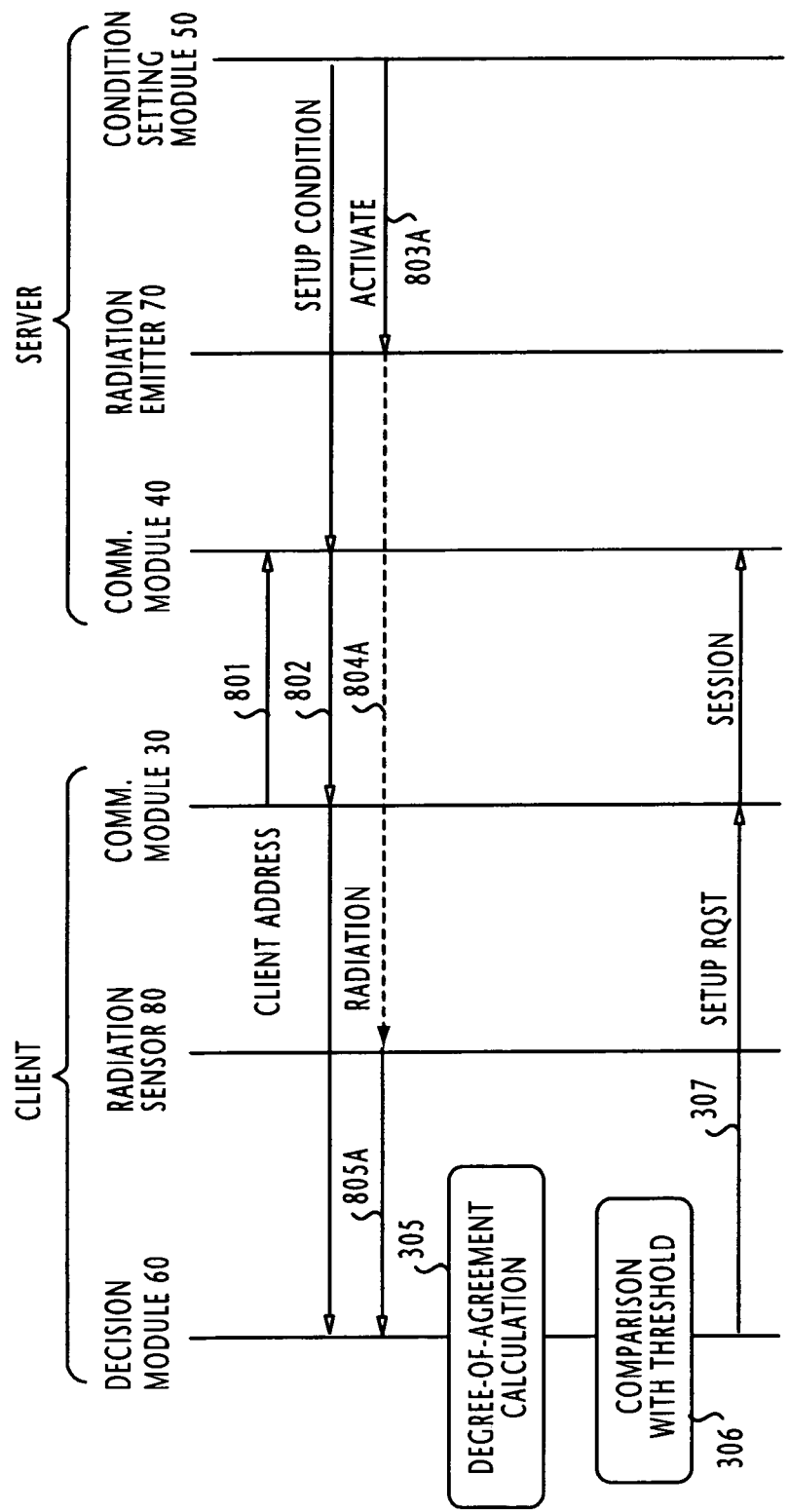
FIG. 19 is a sequence diagram of a session setup operation of the network of FIG. 18.

A sixth form of the first embodiment is shown in FIGS. 18 and 19, which differs from the fifth form (FIGS. 16, 17) in that the radiation sensor 80 is installed on the client terminal 100 and the radiation emitter 70 is installed on each of the server terminals 200 as shown in FIG. 18.

As shown in FIG. 19, the operation of the network of FIG. 18 is similar to that of FIG. 17 with the exception that, between events 802 and 805 of FIG. 17, the server terminal activates its radiation emitter 70 (event 803A) to emit an infrared light beam and modulates it with the server's network address (event 804A). The modulated radiation is received by the client's radiation sensor 80, producing a sensor signal (event 805A) which may be converted to a digital signal by the control module 10 and supplied to the decision module 60.

Instead of modulating the transmitted infrared radiation, all server terminals may be configured so that they respond to the message of event 801 by returning their network addresses to the client terminal. Client terminal calculates different DOA values and selects a server having a DOA value that exceeds the decision threshold as a correct server. Alternatively, the server's network address may be transmitted to the client terminal by combining it with the session setup reference condition (event 802).

Figure 20:
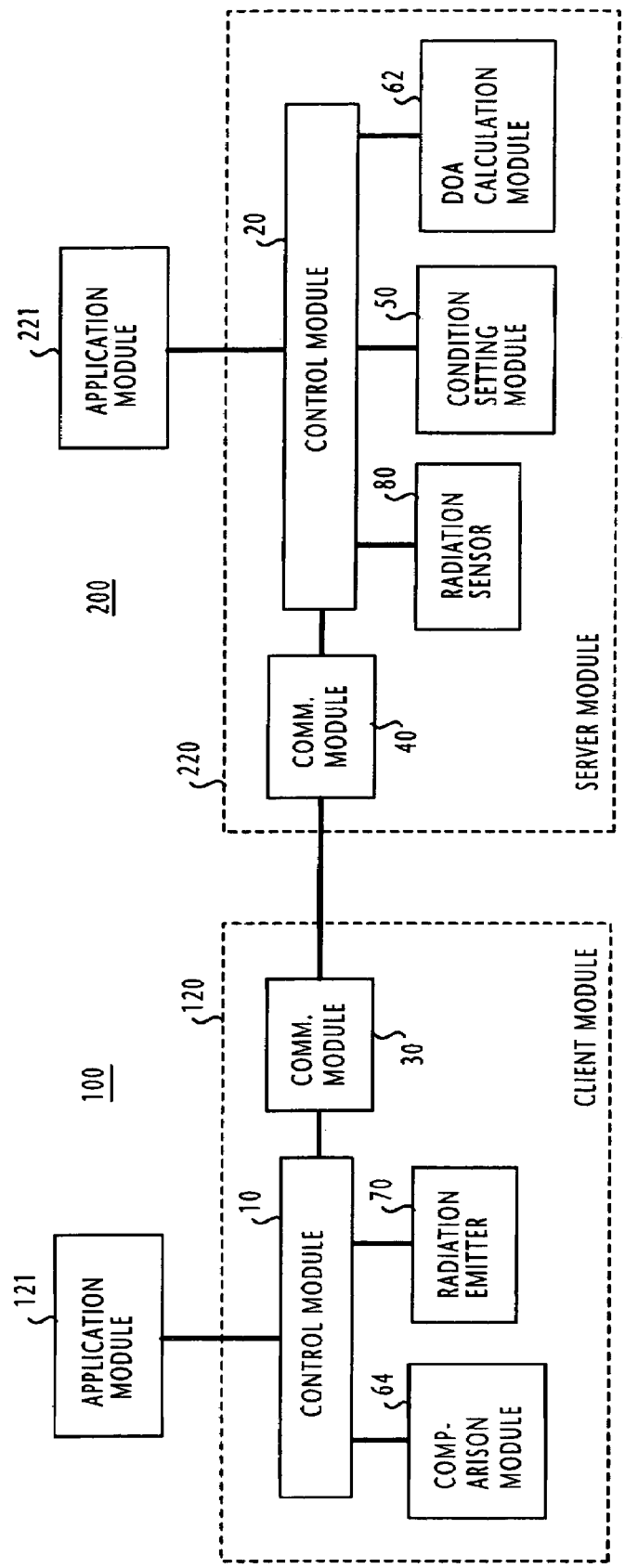
FIG. 20 is a block diagram of the client-server communication network according to a seventh form of the first embodiment of this invention.
Figure 21:
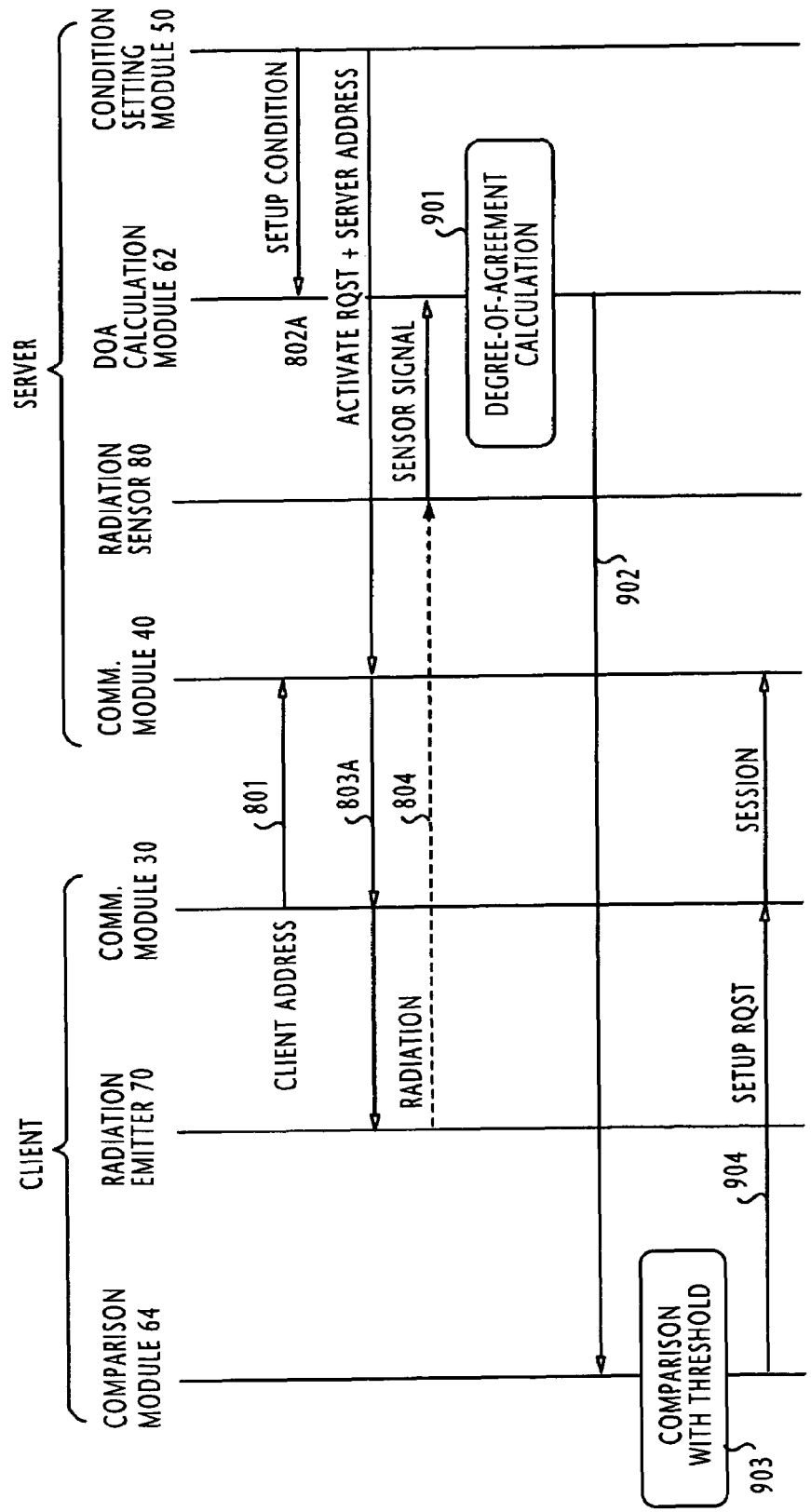
FIG. 21 is a sequence diagram of a session setup operation of the network of FIG. 20.

A seventh form of the first embodiment of this invention is shown in FIGS. 20 and 21, which differs from the fifth form (FIGS. 16, 17) in that the decision module of FIG. 16 is separated into a degree-of-agreement calculation module 62 and a comparison module 64, with the DOA calculation module 62 being installed on each server terminal and the comparison module 64 being installed on the client terminal 100.

As shown in FIG. 21, the operation of the network of FIG. 20 is similar to that of FIG. 17 with the exception that the session setup reference condition is supplied to the server's DOA calculation module 62 (event 802A) and that the server's network address is transmitted to the client terminal along with the emitter activate request message (event 803A). Server's radiation sensor 80 produces a sensor output in response to radiation from the client radiation emitter 70. The DOA calculation module 62 calculates the degree-of-agreement of the sensor output (event 901) and transmits it to the client's comparison module 64 (event 902), which issues a session setup request is the DOA value from the server exceeds the decision threshold (event 904).

Instead of transmitting the server's network address with the emitter activate request message, all server terminals may be configured so that they respond to the message of event 801 by returning their network addresses to the client terminal, In this case, the client terminal produces different comparison results from the comparison module 64 and selects a server terminal that most adequately satisfies the session setup condition as a correct server. Alternatively, the server's network address may be transmitted to the client terminal by combining it with the DOA value (event 902).

Figure 22:
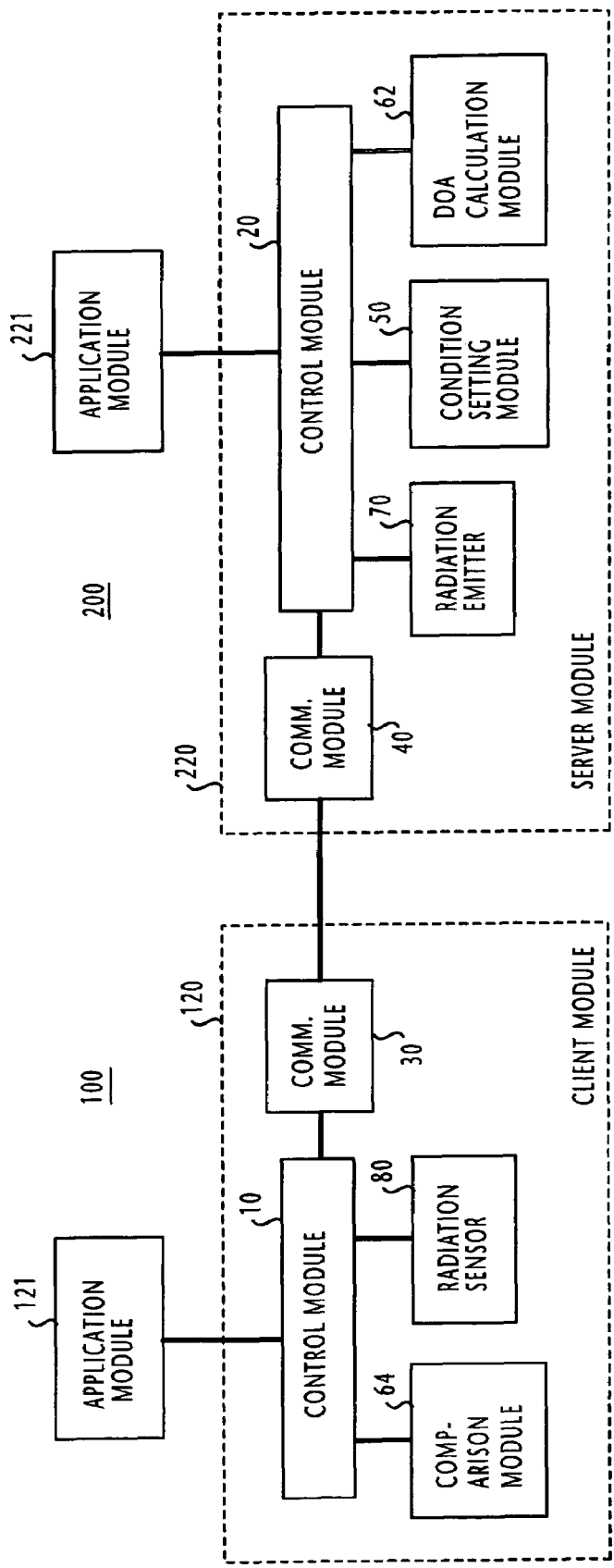
FIG. 22 is a block diagram of the client-server communication network according to an eighth form of the first embodiment of this invention.
Figure 23:
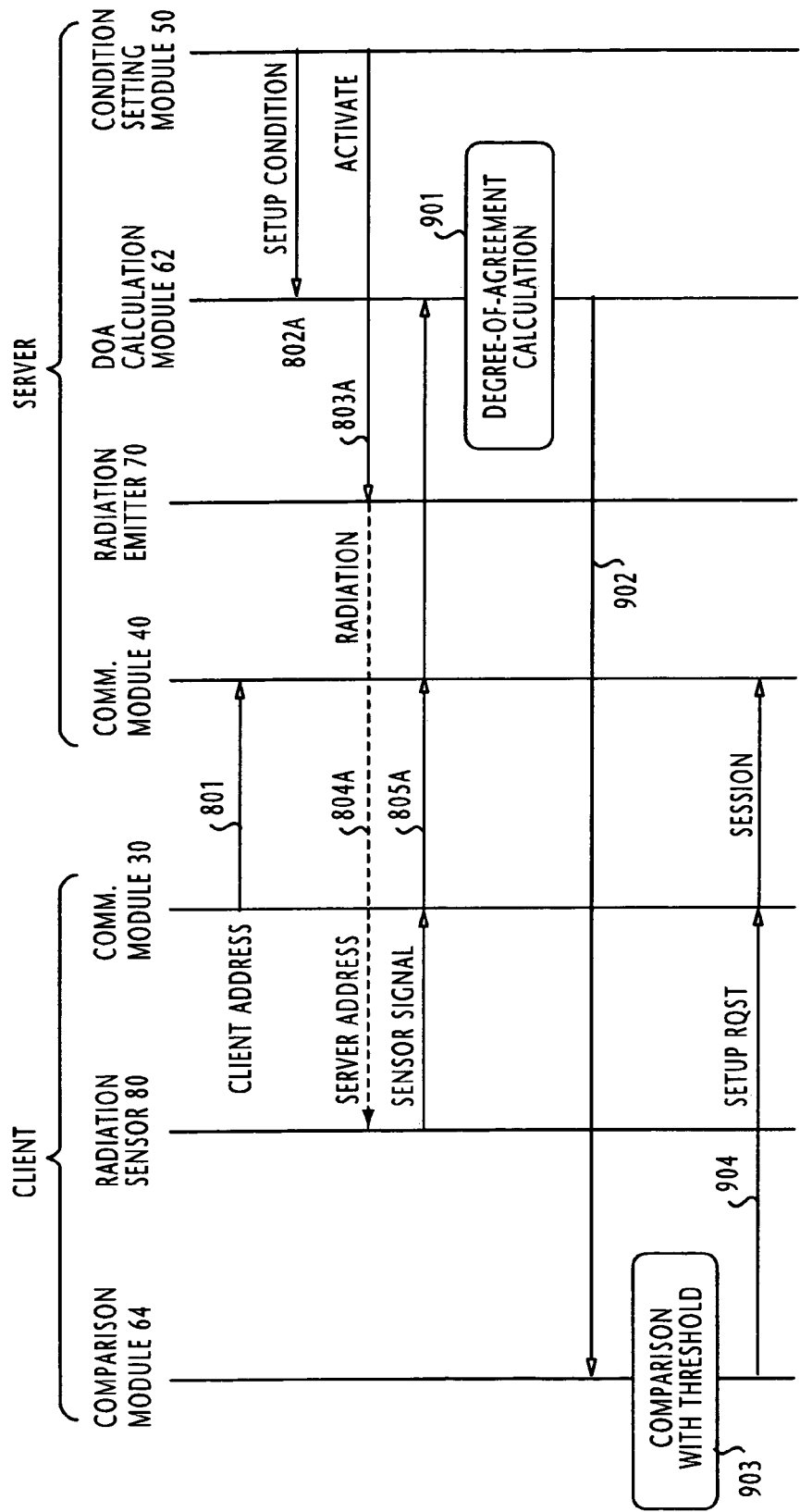
FIG. 23 is a sequence diagram of a session setup operation of the network of FIG. 22.

An eighth form of the first embodiment of this invention is shown in FIGS. 22 and 23, which differs from the seventh form (FIGS. 20, 21) in that the radiation emitter 70 is provided on each server terminal and the radiation sensor 80 is installed on the client terminal.

As shown in FIG. 23, the operation of the network of FIG. 22 is similar to that of FIG. 21 with the exception that when the condition setting module 50 activates the radiation emitter 70 (event 803A), the server's network address is superimposed on the infrared radiation transmitted from the emitter 70 (event 804A). Client's radiation sensor 80 responds with a sensor signal (event 805A) for transmission to the DOA calculation module 62.

Instead of superimposing the server's network address on the infrared light, all server terminals may be configured so that they respond to the message of event 801 by returning their network addresses to the client terminal. In this case, the client terminal produces different comparison results from the comparison module 64. The client terminal then selects the correct server terminal that most adequately satisfies the session setup condition. Alternatively, the server's network address may be transmitted to the client terminal by combining it with the DOA value (event 902).

In the foregoing description of the first embodiment of the present invention, the client terminal is responsible for making the session setup decision. In the second embodiment of the present invention which will be described below, the server terminal is responsible for making the session setup decision. The second embodiment provides eight forms of its embodiment respectively corresponding to the eight forms of the first embodiment.

Figure 24:
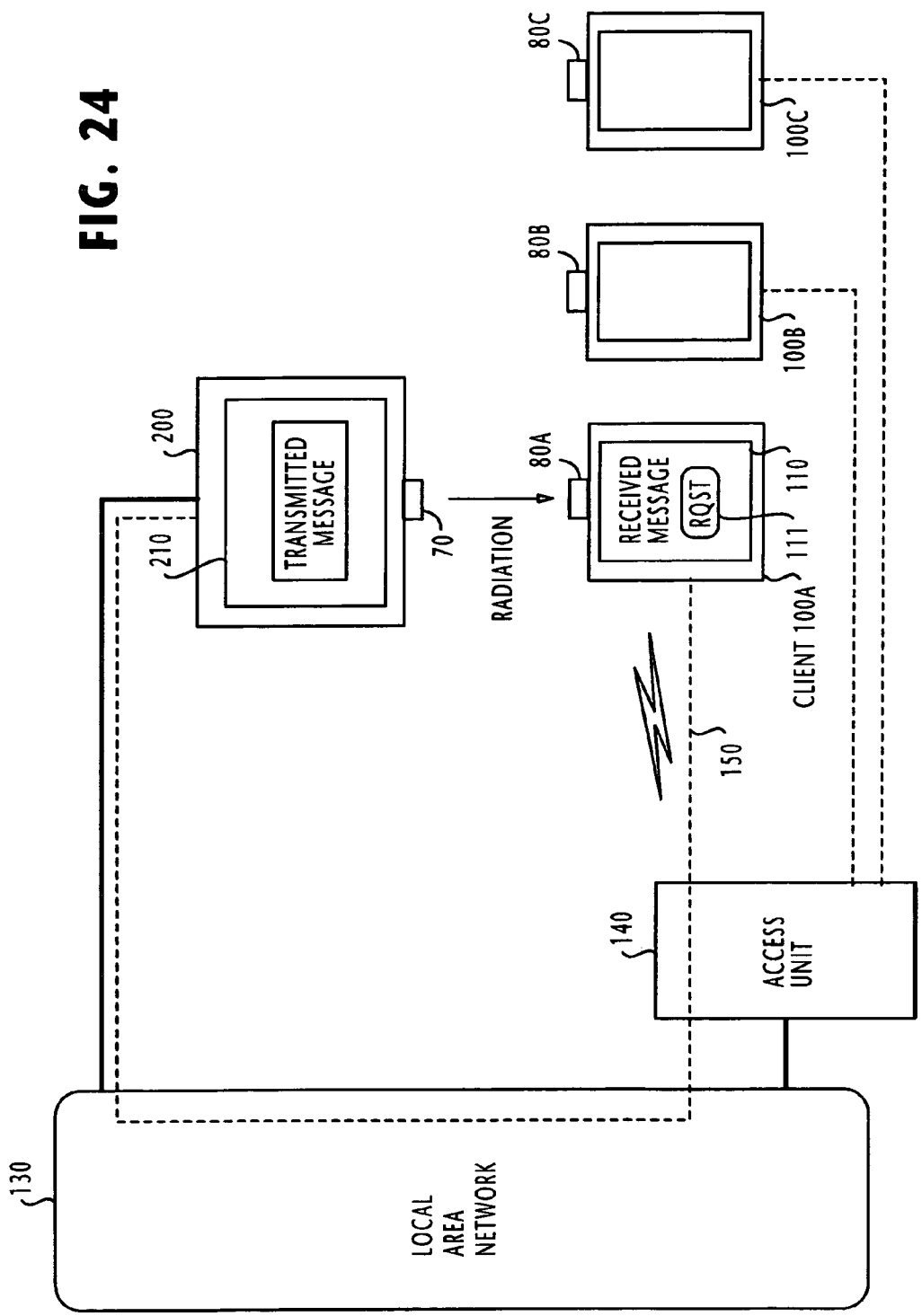
FIG. 24 is a block diagram of a communications network which is suitable for application to the second embodiment of the present invention.

A communications network which is suitable for implementing the second embodiment of the invention is illustrated in FIG. 24. In this network, only one server terminal 200 and a plurality of client terminals 100A, 100B and 100C are provided. Between the server terminal and only one of the client terminals that is nearest to it, a session 150 is established via the LAN 130 and wireless access unit 140, even though a wireless link is established between each client terminal and the access unit 140.

The network of this type can be used to transmit a message, or commercial advertisement, shown in the server's user interface 210 to the user interface 110 of the nearest client terminal 100A when the user touches a RQST (request) button 111 on the user interface 110.

Prior to the establishment of a session, the server terminal 200 broadcasts its network address over the LAN 130 in response to a request from the application module so that all client terminals are informed of the network address of the server terminal via the wireless access unit 140. If one of the client terminal desires to receive the message from the server terminal 200, it establishes an infrared light link with the server terminal and uses the notified address of the server to establish a session. Then the user at the client terminal touches the "RQST" button.

In some of the forms of the second embodiment, the radiation emitter 70 is provided on the server terminal 200 and the radiation sensor 80 is provided on each of the client terminals. In the other forms, they are transposed so that the server terminal is provided with the sensor 80 and each client terminal with the emitter 70.

Figure 25:
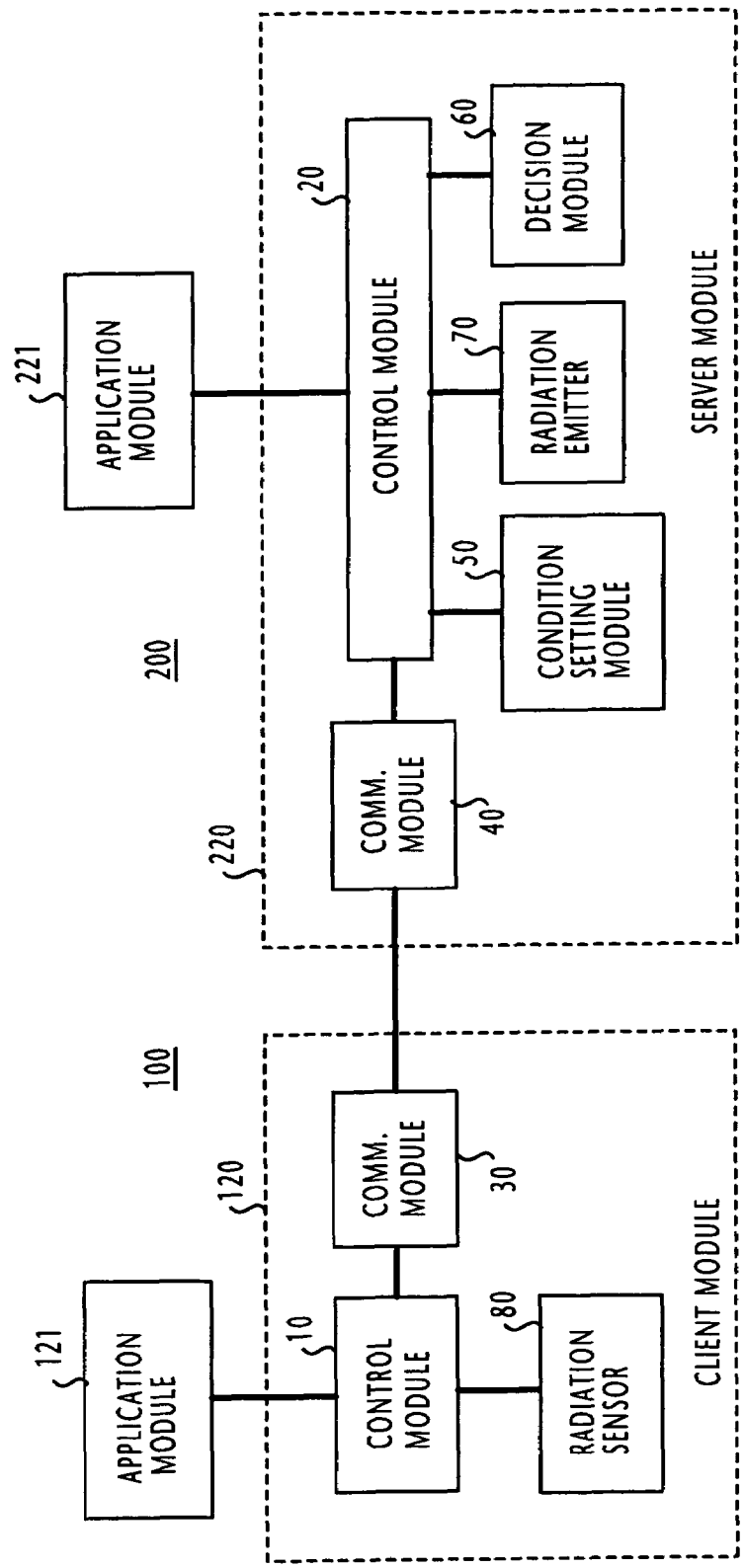
FIG. 25 is a block diagram of the client-server communication network according to a first form of the second embodiment of this invention.
Figure 26:
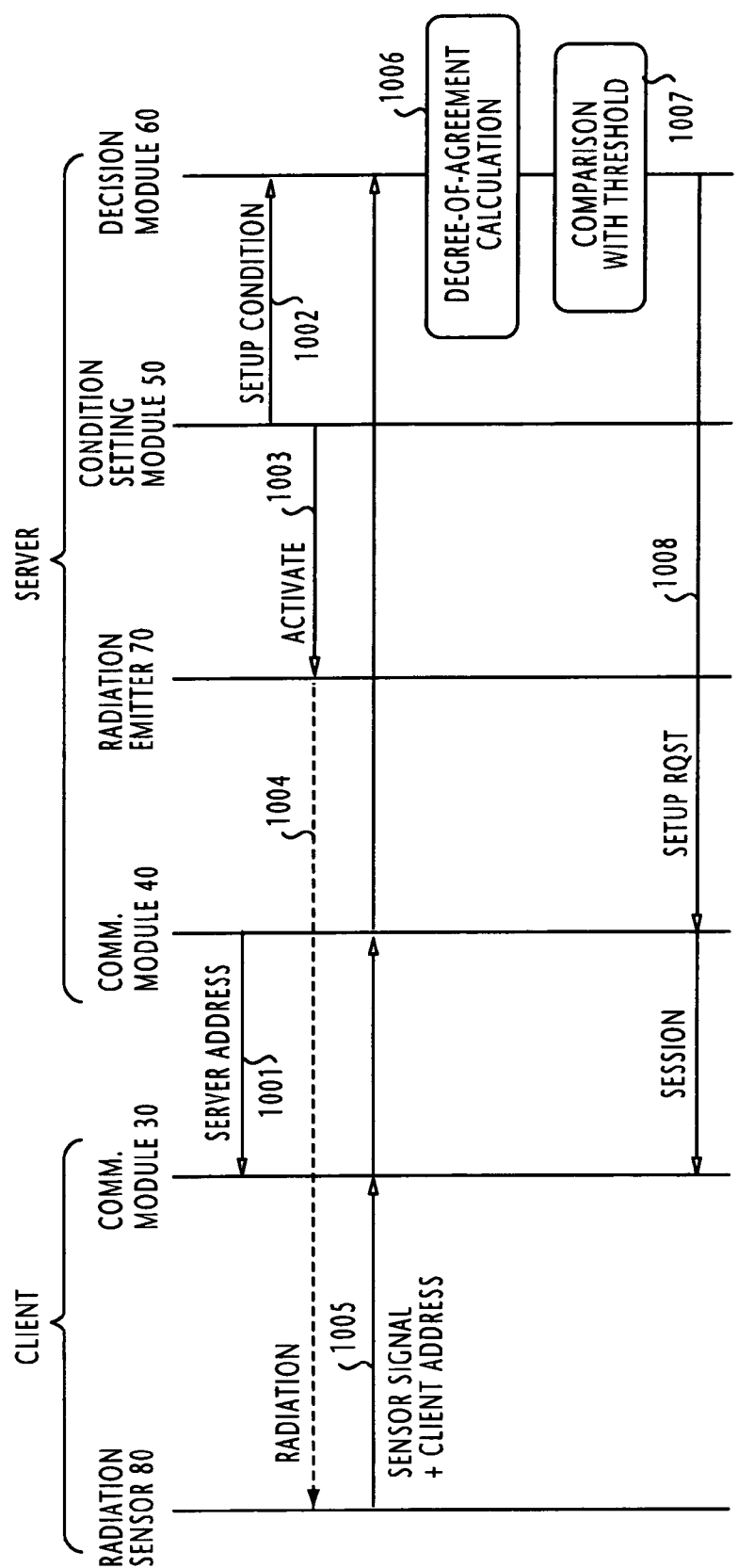
FIG. 26 is a sequence diagram of a session setup operation of the network of FIG. 25.

The first form of the second embodiment is shown in FIGS. 25 and 26. In this form of the invention, the condition setting module 50, decision module 60 and the radiation emitter 70 are provided in the server terminal 200 and the radiation sensor 80 is provided on each client terminal 100, as illustrated in FIG. 25.

The operation of the network of FIG. 25 starts with the server application module issuing a request to the control module 20 to broadcast the server network address through the communication module 40 over the LAN 130 to the communication module 30 of each client terminal.

As shown in FIG. 26, a broadcast message containing the server's address may be transmitted from the condition setting module 50 to each client terminal 100 (event 1001). The server's network address received by the client's communication module 30 is supplied to the control module 10 and stored in memory. Server condition setting module 50 supplies a session setup reference condition to the decision module 60 (event 1002) and then activates the radiation emitter 70 (event 1003), resulting in the emission of an infrared light beam (event 1004). If one of the client terminals receives this infrared light beam, it produces a sensor signal. A digital version of this sensor signal and the network address of the client terminal are encapsulated in a message destined to the server's network address and transmitted to the LAN 130 via the communication module 30 (event 1005). Decision module 60 of the server terminal 200 receives this sensor signal and calculates its degree of agreement set by the condition setting module 60 (event 1006). The calculated DOA value is compared with the decision threshold (event 1007). If the calculated value is higher than the threshold, a setup request message destined to the received client's terminal address is sent to the communication module 40 to establish a session 150 (event 1008).

Figure 27:
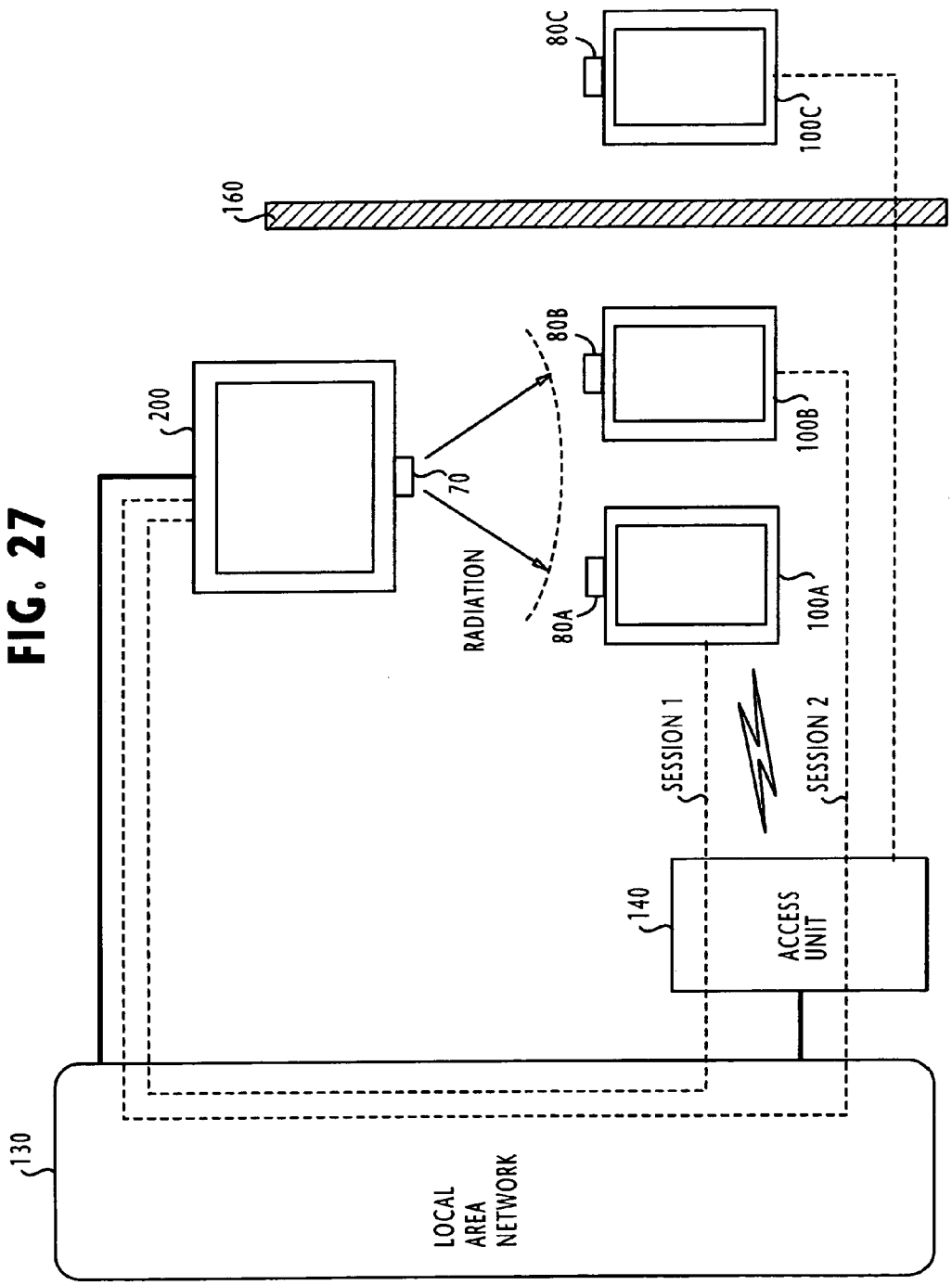
FIG. 27 is a block diagram of a client-server communication network of the second embodiment in which a wide beam of infrared light is used to establish a number of sessions with multiple server terminals.

The network of the second embodiment of this invention can be configured as shown in FIG. 27 in which the client terminal 100C is separated from the other client terminals by the wall 160 and the radiation emitter 70 of the server terminal 200 emits a wide beam of infrared radiation so that it covers an area in which the radiation sensors 80A and 80B of client terminals 100A, 100B are located. By the presence of wall 160, the infrared light beam is prevented from reaching the radiation sensor 80C. In this network, the client terminals 100A and 100B communicate with the wireless access unit 140 through the wall 160 and receive the infrared radiation from the server terminal 200. Client terminals 100A and 100B each successively perform the previously described operation of FIG. 26 to respectively establish sessions 1 and 2 to the server terminal 200. In this way, the server terminal is able to establish a number of sessions with a number of client terminals located within the same room for simultaneously transmitting data files.

The established session is cleared by using the release mechanism in a manner similar to that shown in FIG. 7. Instead of using this session release mechanism, an established session is released by simply moving the client terminal 100A away from the associated server terminal 200 in a manner similar to that previously shown and described with reference to FIG. 8.

The network may be configured so that a session once established is maintained until the transfer of a data file is completed even though the communicating client terminal 100A is removed from the server terminal 200 out of the detection range of the sensor 80A. In this case, an instruction is sent either from the client's or server's application module to the associated control module when a data file has been transmitted. In response to this instruction, the control module issues a session release command to the communication module in a manner similar to that shown in FIG. 9A or 9B.

Figure 28:
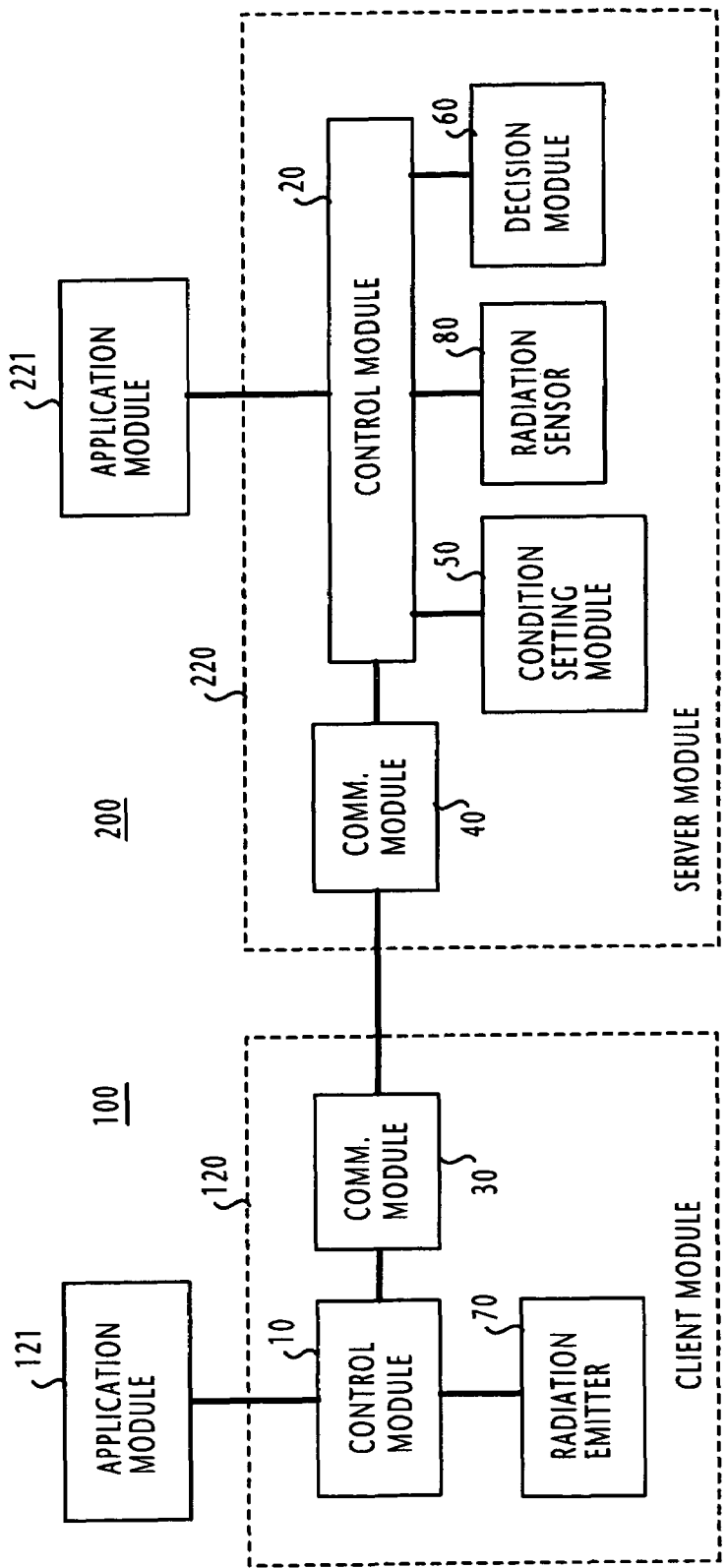
FIG. 28 is a block diagram of the client-server communication network according to a second form of the second embodiment of this invention.
Figure 29:
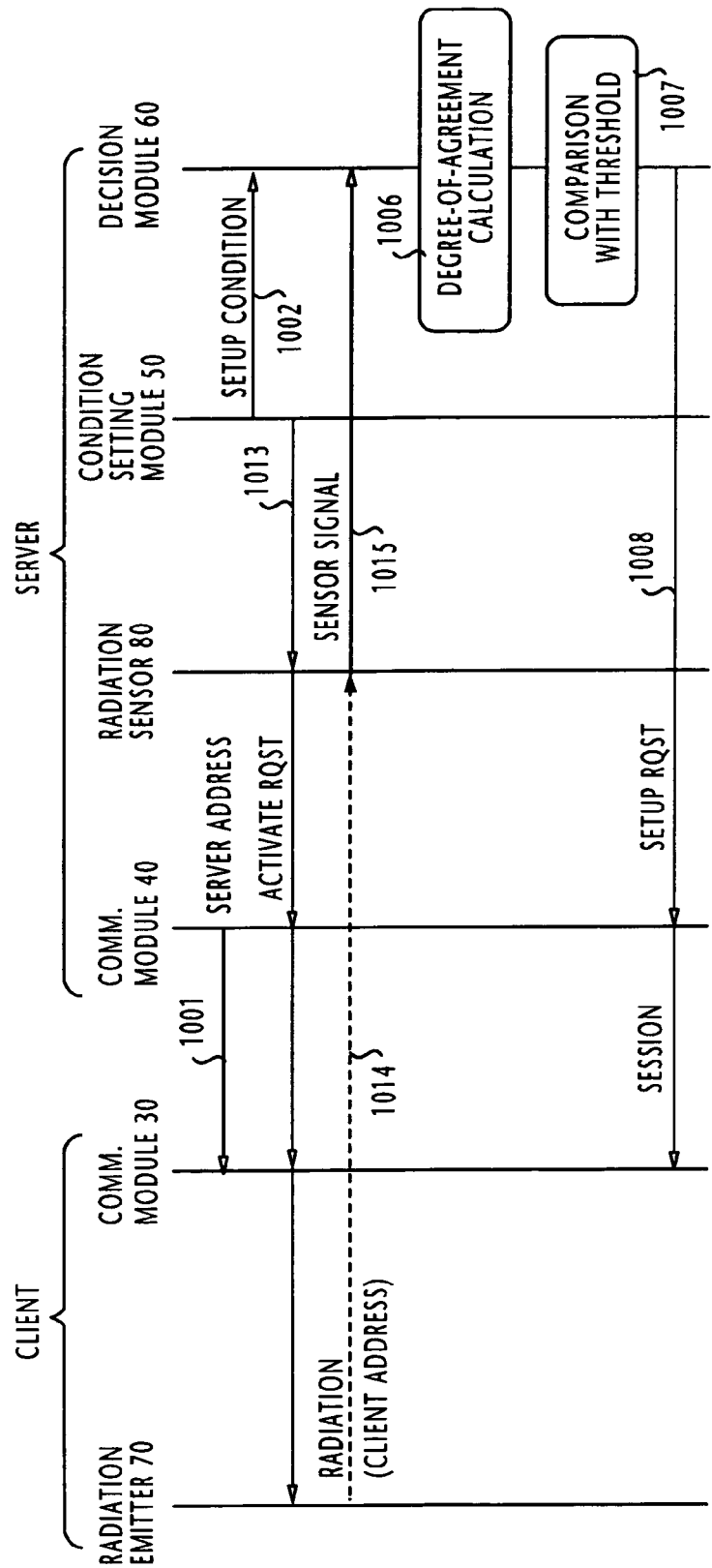
FIG. 29 is a sequence diagram of a session setup operation of the network of FIG. 28.

FIGS. 28 and 29 illustrate a second form of the second embodiment, which is similar to the first form of this embodiment shown in FIGS. 25 and 26 with the exception that the radiation emitter 70 is located in each client terminal 100 and the radiation sensor 80 is located in the server terminal 200.

In FIG. 29, the operation of the network of FIG. 28 proceeds in the same manner as that of FIG. 26 with the exception that the server's condition setting module 50 transmits an emitter activate request message to the client terminal (event 1013). In response to this message, the client's radiation emitter 70 emits an infrared light beam modulated with the network address of the client terminal to the server's radiation sensor 80 (event 1014). As a result, the server's radiation sensor 80 produces a sensor output (event 1015), which is supplied to the server's decision module 60.

Instead of modulating the infrared light with the client's network address, all client terminals may be configured so that they respond to the server network address of event 1001 by returning their respective network addresses to the server terminal. In this case, the server terminal calculates different DOA values and selects a client terminal having the DOA value that exceeds the decision threshold as a correct client terminal.

Figure 30:
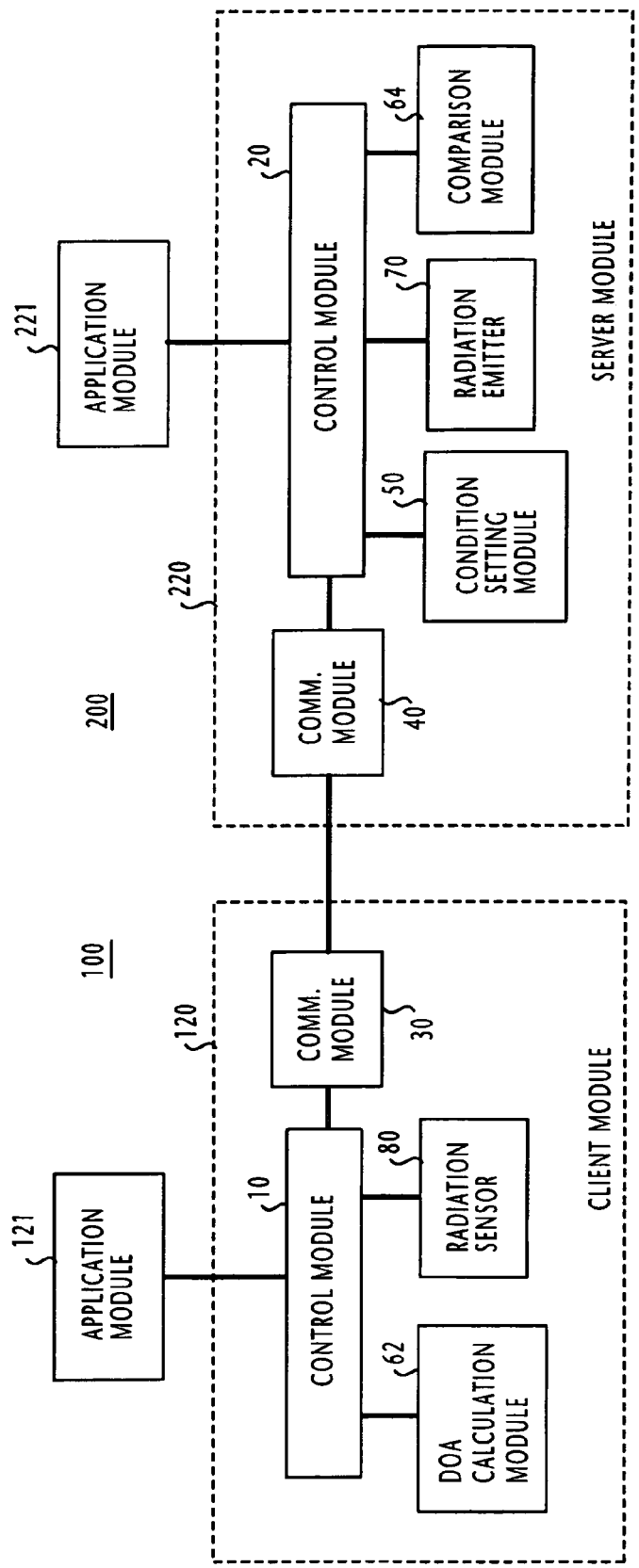
FIG. 30 is a block diagram of the client-server communication network according to a third form of the second embodiment of this invention.
Figure 31:
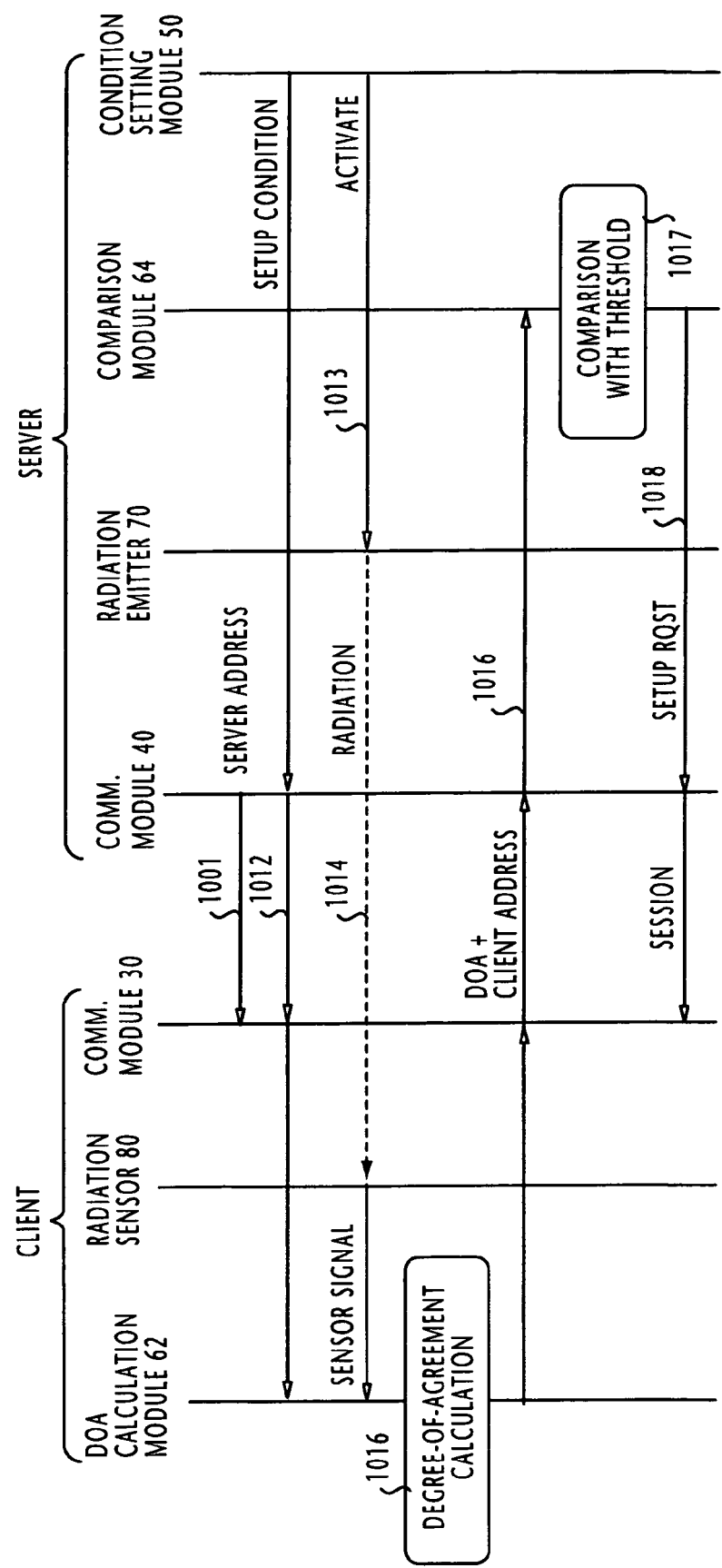
FIG. 31 is a sequence diagram of a session setup operation of the network of FIG. 30.

In FIGS. 30 and 31, a third form of the second embodiment is shown, which is similar to FIGS. 25 and 26, but differs in that the decision module of FIG. 25 is separated into a degree-of-agreement calculation module 62 and a comparison module 64, with the DOA calculation module 62 being installed on each client terminal and the comparison module 64 on the server terminal 200.

In FIG. 31, the operation of the network of FIG. 30 proceeds in the same manner as that of FIG. 26 with the exception that the server's condition setting module 50 transmits a session setup reference condition to all client terminals (event 1012) via the LAN 130 and then activates the server's radiation emitter 70 (event 1013), resulting in the emission of infrared radiation to the radiation sensor 80 of one of the client terminals (event 1014). The client's radiation sensor 80 responds to the incident infrared light by producing a sensor signal. The client's DOA calculation module 62 calculates the DOA value of the sensor signal (event 1016) and formulates a message with the calculated DOA value and the client's network address. The message is destined to the server's network address which was notified by event 1001 and transmitted to the server terminal (event 1016). Comparison module 64 compares the DOA value contained in the message with the decision threshold (event 1017). If the threshold is exceeded, a setup request message destined to the client's network address is sent to the LAN 130 (event 1018) to establish a session.

Instead of combining the client's network address with the calculated DOA value, all client terminals may be configured so that they respond to the server network address of event 1001 by returning their respective network addresses to the server terminal. In this case, the server terminal receives different DOA values and selects a client terminal having the DOA value that exceeds the decision threshold as a correct client terminal.

Figure 32:
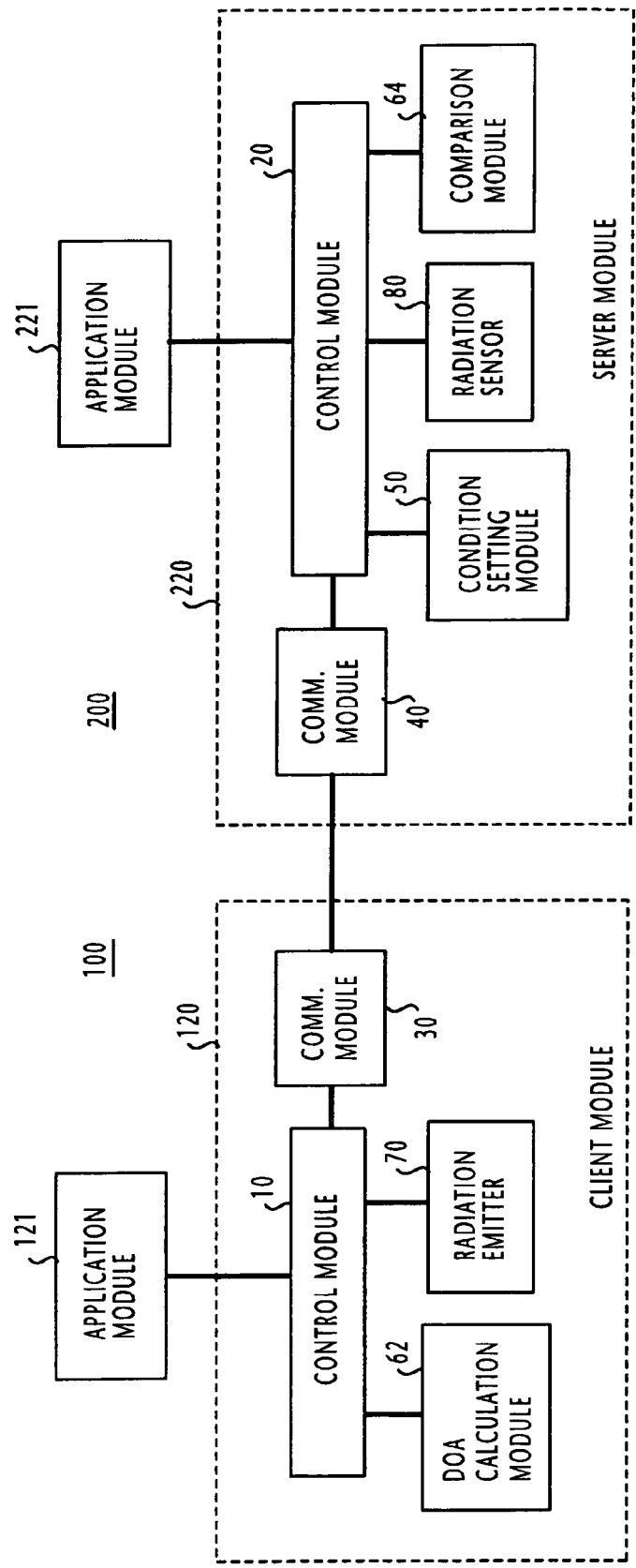
FIG. 32 is a block diagram of the client-server communication network according to a fourth form of the second embodiment of this invention.
Figure 33:
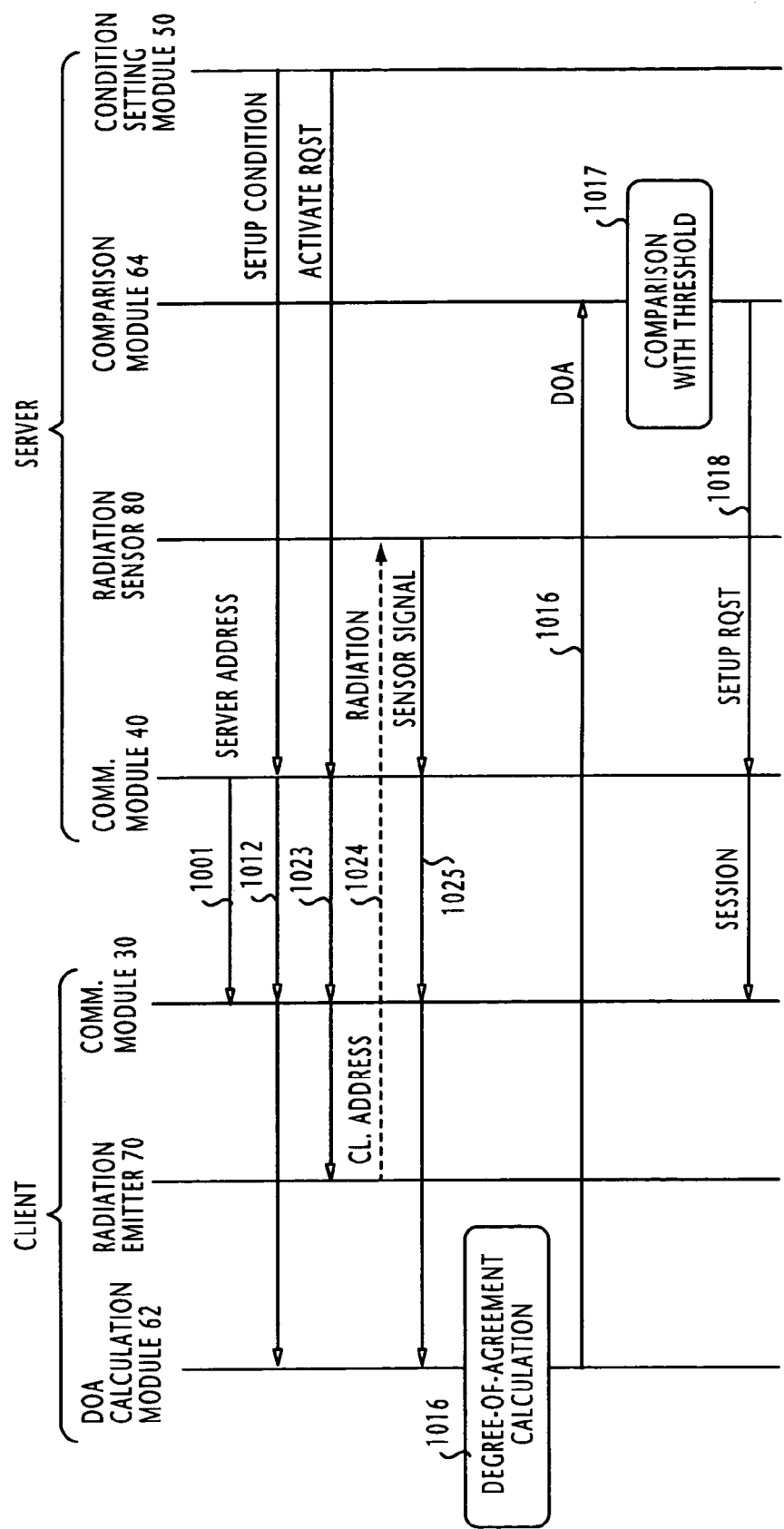
FIG. 33 is a sequence diagram of a session setup operation of the network of FIG. 32.

In FIGS. 32 and 33, a fourth form of the second embodiment is shown, which is similar to FIGS. 30 and 31, but differs in that the radiation emitter 70 is provided in each client terminal 100 and the radiation sensor 80 in the server terminal 200.

In FIG. 33, the operation of the network of FIG. 32 proceeds in the same manner as that of FIG. 31 with the exception that the server's condition setting module 50 transmits an emitter activate request message to all client terminals via the LAN 130 (event 1023), resulting in the radiation emitter 70 of each client terminal giving off an infrared light beam to the server terminal (event 1024). The infrared light beam of each client terminal is modulated with the individual network address. The server's radiation sensor 80 responds to the incident infrared light from one of the client terminals that is nearest to the server by transmitting a sensor signal to the nearest client terminal (event 1025).

Instead of modulating the radiation energy with the client's network address, all client terminals may be configured so that they respond to the server network address of event 1001 by returning their respective network addresses to the server terminal. In this case, the server terminal receives different DOA values and selects a client terminal having the DOA value that exceeds the decision threshold as a correct client terminal. Alternatively, the client's network address can be transmitted to the server by combining it with the calculated DOA value when it is sent from each client terminal to the server.

Figure 34:
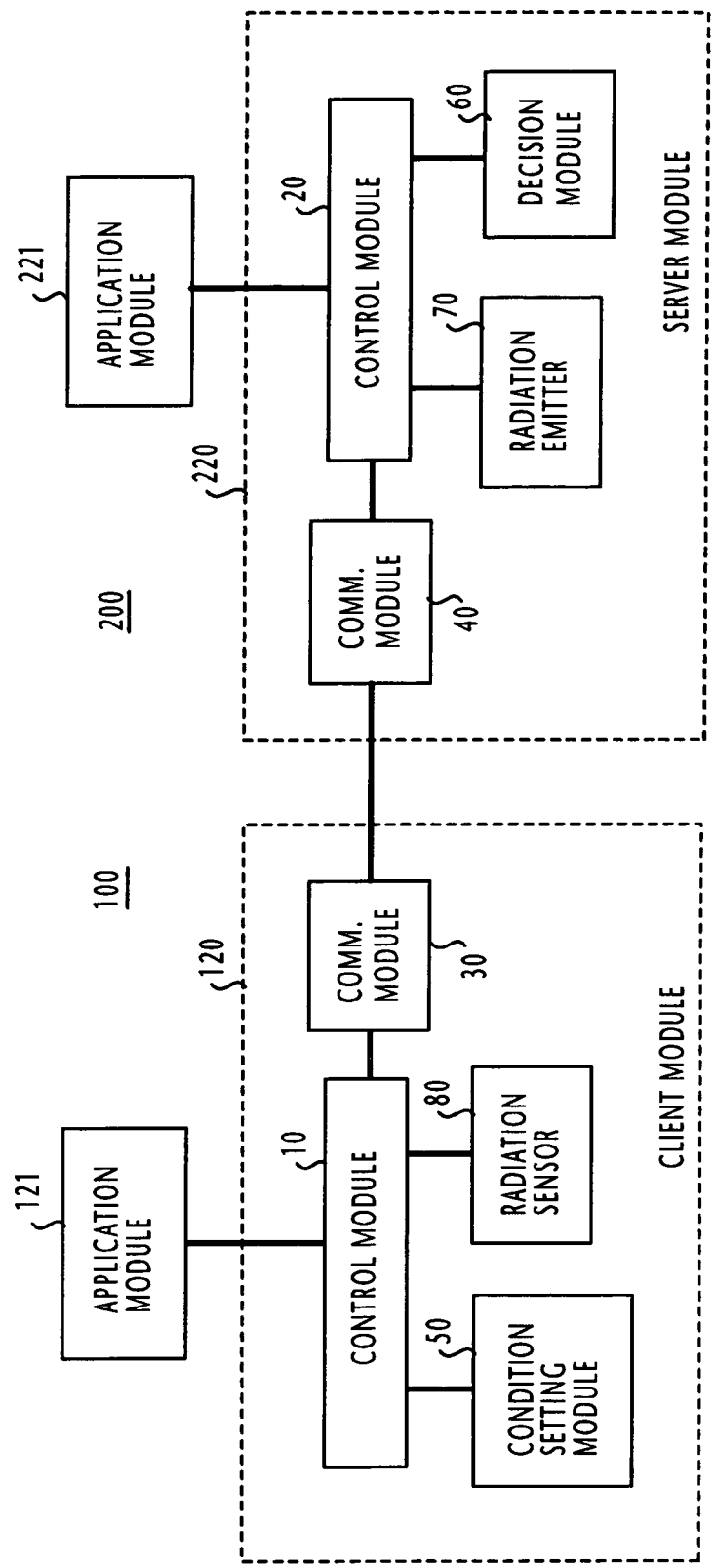
FIG. 34 is a block diagram of the client-server communication network according to a fifth form of the second embodiment of this invention.
Figure 35:
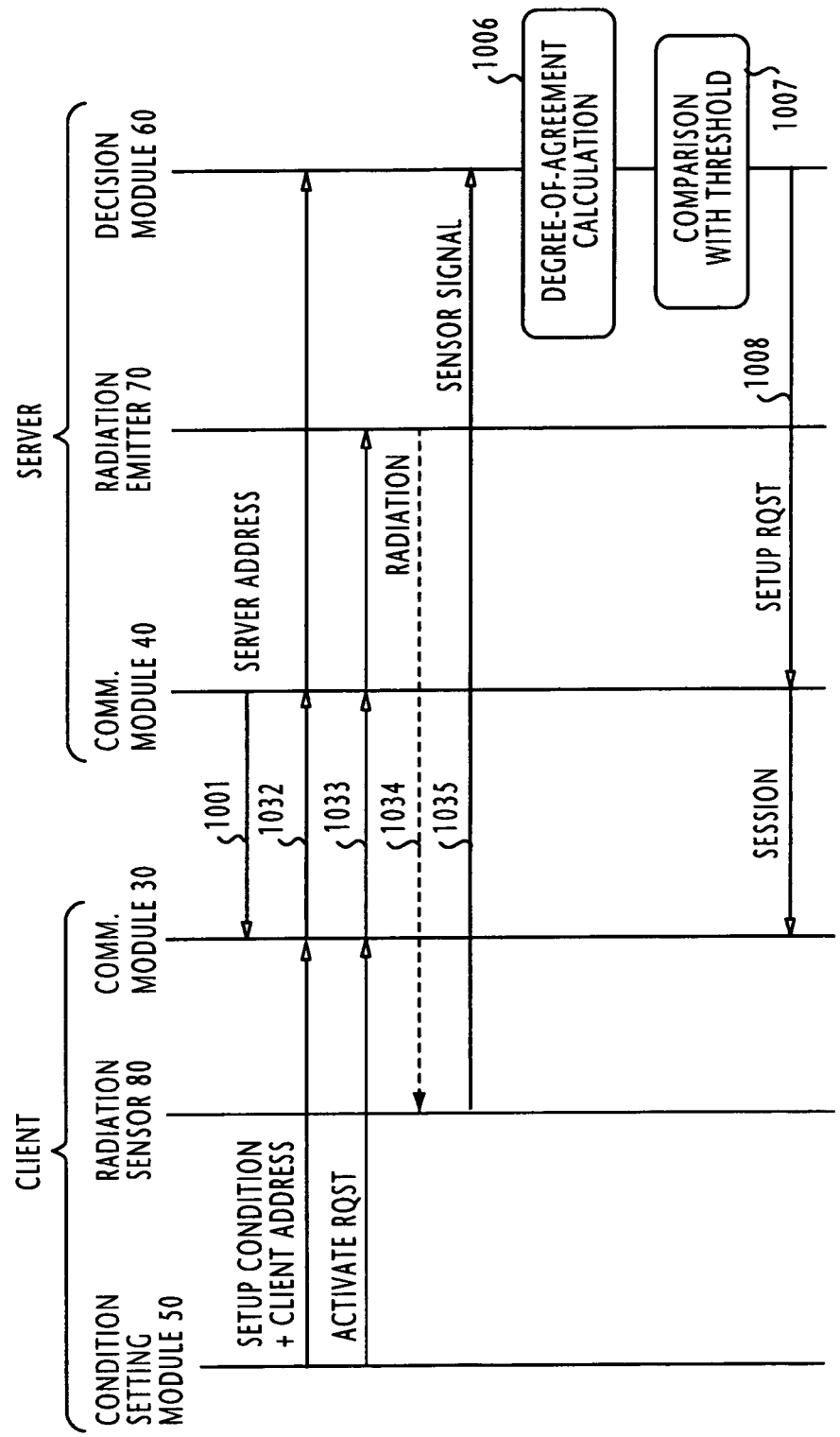
FIG. 35 is a sequence diagram of a session setup operation of the network of FIG. 34.

FIGS. 34 and 35 illustrate a fifth form of the second embodiment, which is similar to the first form of this embodiment (FIGS. 25 and 26) with the exception that the condition setting module 50 is located in each client terminal 100, instead of it being in the server terminal 200.

In FIG. 35, the operation of the network of FIG. 34 proceeds in the same manner as that of FIG. 26 with the exception that the condition setting module 50 of each client terminal transmits a session setup reference condition and the network address of the client terminal to the server (event 1032). Subsequently, the condition setting module 50 transmits an emitter activate request message to the server (event 1033). In response to this request, the server's radiation emitter 70 emits an infrared light beam to the radiation sensor 80 of one of the client terminals that is nearest to the server (event 1034). As a result, the radiation sensor 80 of the nearest client terminal transmits a sensor signal to the server's decision module 60 (event 1035).

Instead of transmitting each client's network address with a session setup condition, all client terminals respond to the server network address of event 1001 by returning their respective network addresses to the server terminal. Server terminal eventually calculates different DOA values and selects a client terminal having the DOA value that exceeds the decision threshold as a correct client terminal.

Figure 36:
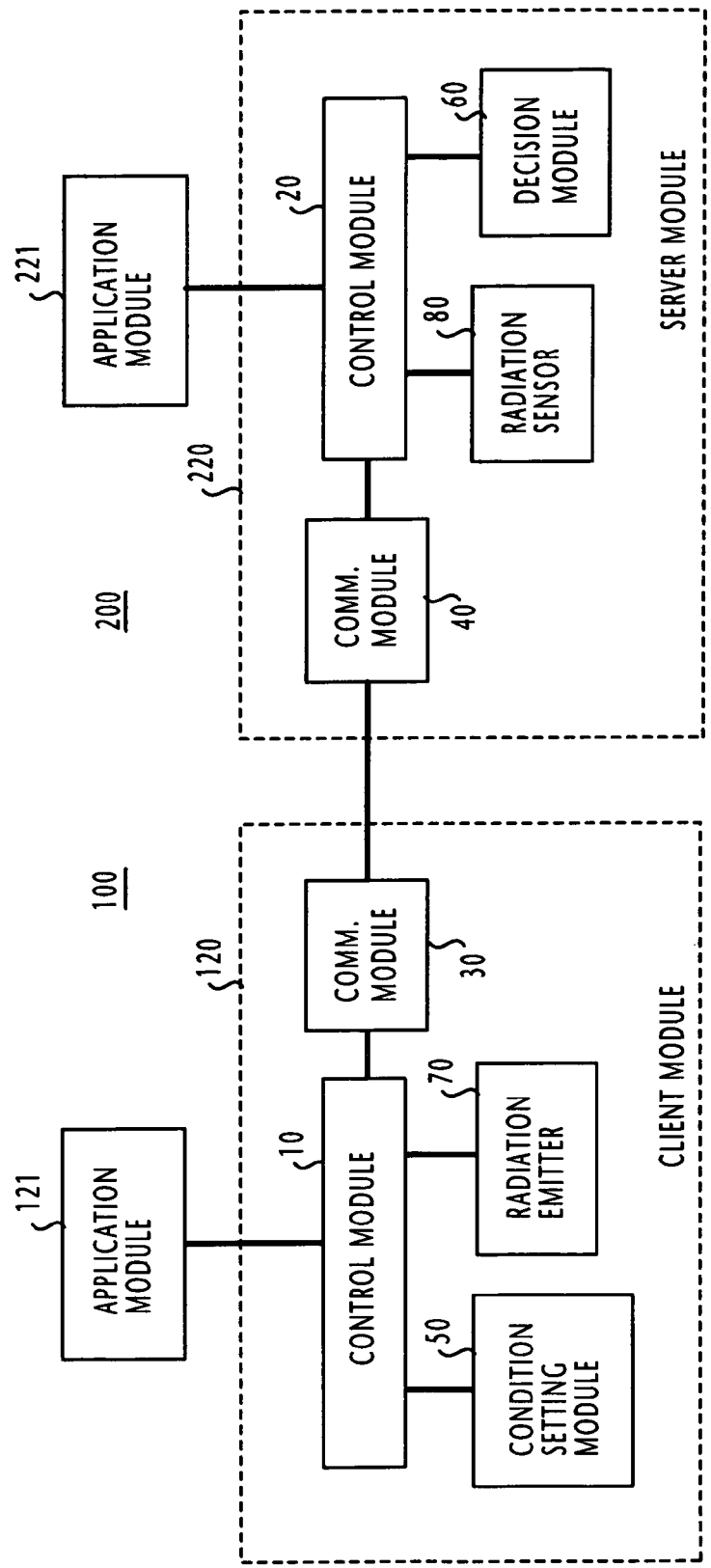
FIG. 36 is a block diagram of the client-server communication network according to a sixth form of the second embodiment of this invention.
Figure 37:
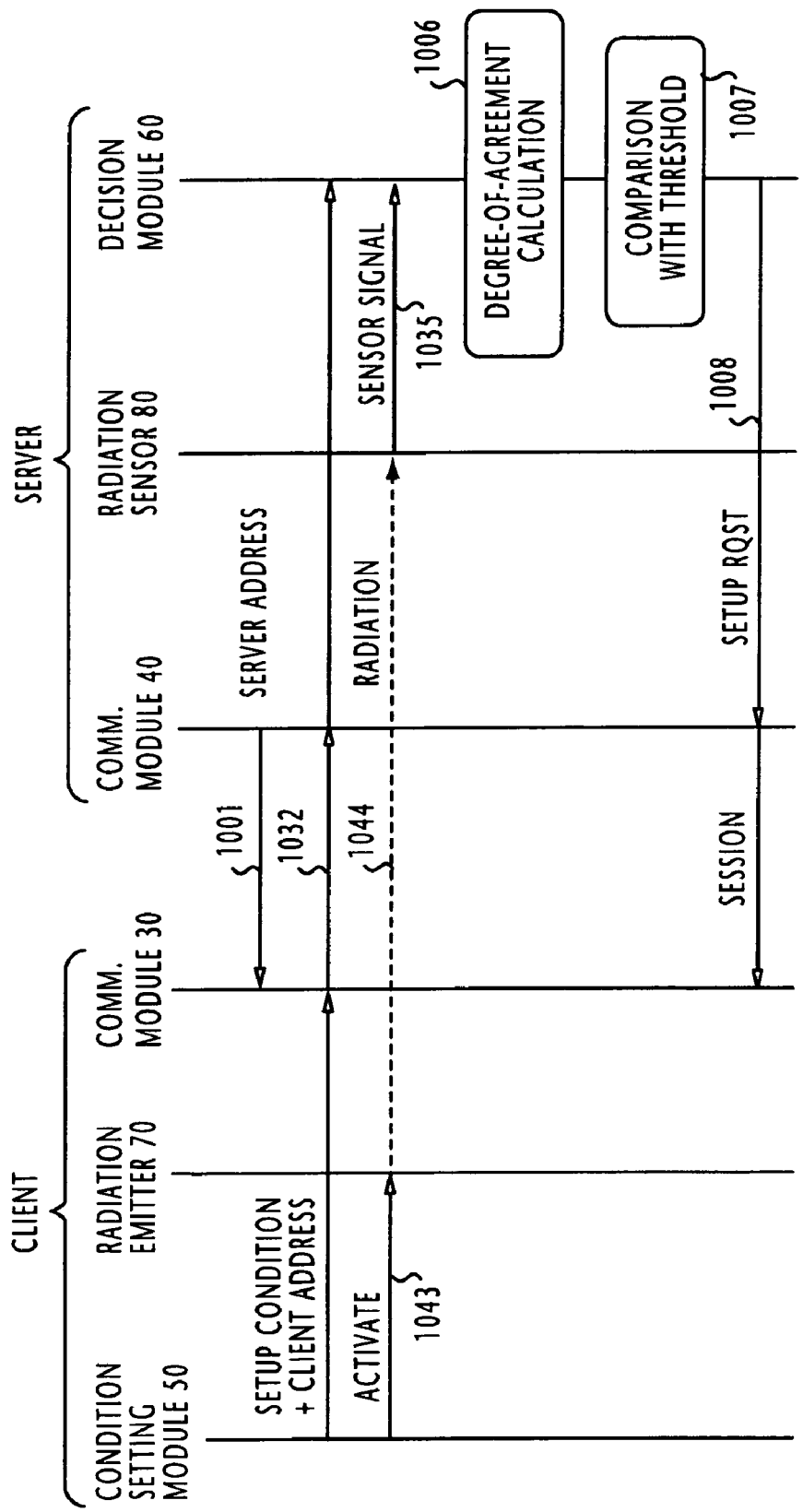
FIG. 37 is a sequence diagram of a session setup operation of the network of FIG. 36.

A sixth form of the second embodiment is shown in FIGS. 36 and 37, which is similar to the fifth form of the second embodiment (FIGS. 34 and 35) with the exception that the radiation emitter 70 is provided in the server terminal and the radiation sensor 80 is located in each of the client terminals.

In FIG. 35, the operation of the network of FIG. 34 proceeds in the same manner as that of FIG. 35 with the exception that after the condition setting module 50 of each client terminal performed event 1032, it activates its radiation emitter 70 (event 1043), causing an infrared light beam to be emitted to the server's radiation sensor 80 (event 1044).

Instead of transmitting each client's network address with a session setup condition, it may be transmitted by modulating it on the radiation energy when the emitter 70 of each client terminal is activated (event 1043).

Figure 38:
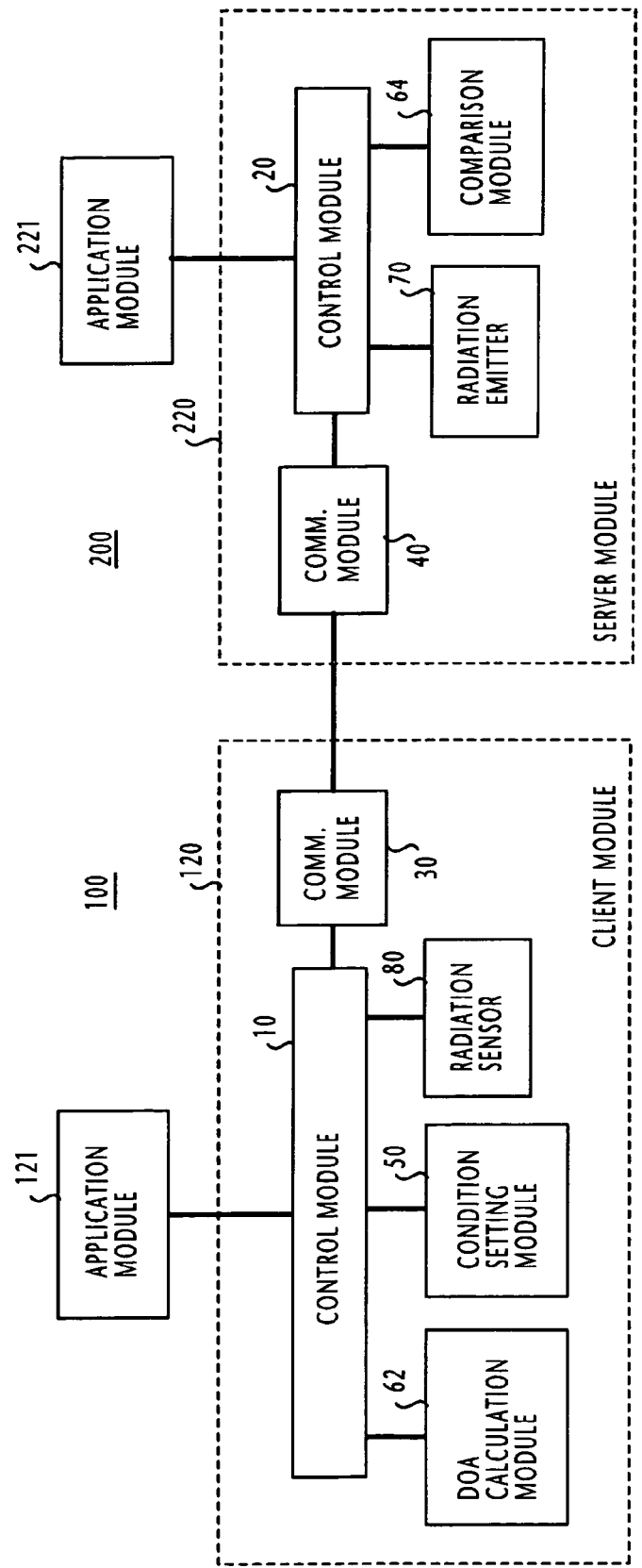
FIG. 38 is a block diagram of the client-server communication network according to a seventh form of the second embodiment of this invention.
Figure 39:
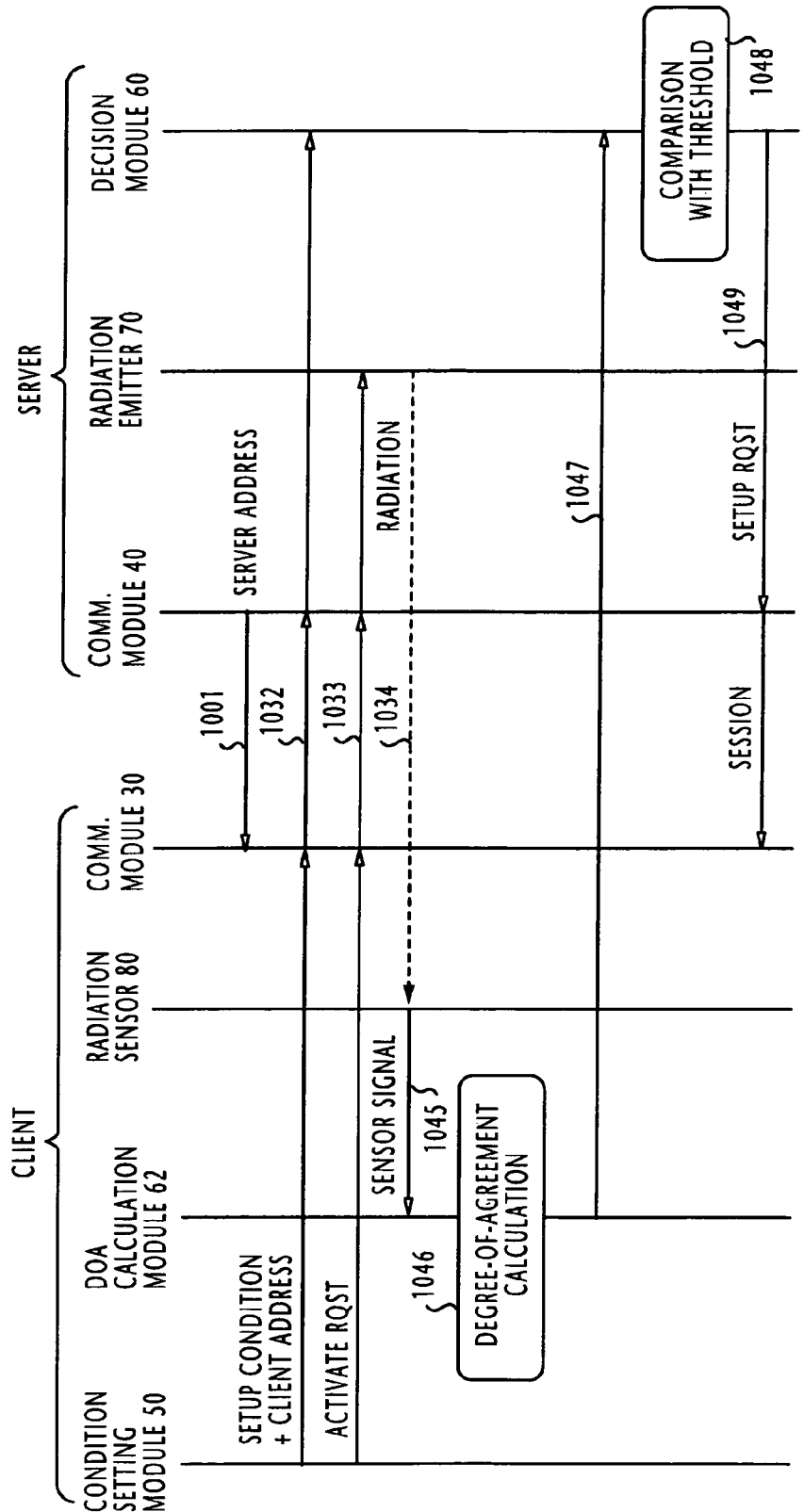
FIG. 39 is a sequence diagram of a session setup operation of the network of FIG. 38.

The seventh form of the second embodiment is shown in FIGS. 38 and 39, which is similar to the fifth form of the second embodiment (FIGS. 34 and 35) with the exception that the decision module 60 is separated into a DOA calculation module 62 and a comparison module 64 and respectively installed on each client terminal and the server terminal.

In FIG. 39, the operation of the network of FIG. 38 proceeds in the same manner as that of FIG. 35 with the exception that the radiation sensor 80 of each client terminal supplies its sensor signal to the client's DOA calculation module 62 (event 1045) to calculate its DOA value (event 1046). The calculated DOA value is sent to the server terminal (event 1047) and compared by the comparison module 64 with the decision threshold (event 1048). If the decision threshold is exceeded, a session request message is transmitted to the LAN 130 (event 1049).

Figure 40:
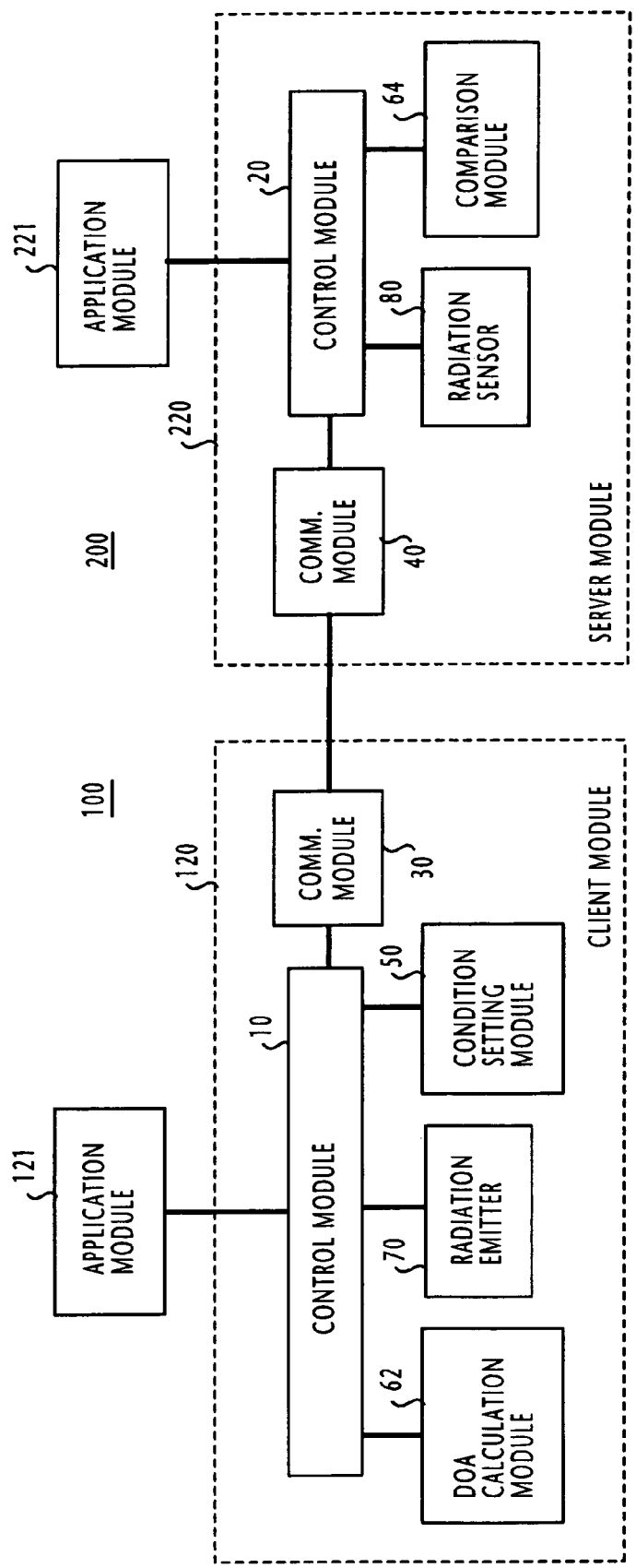
FIG. 40 is a block diagram of the client-server communication network according to an eighth form of the second embodiment of this invention.
Figure 41:
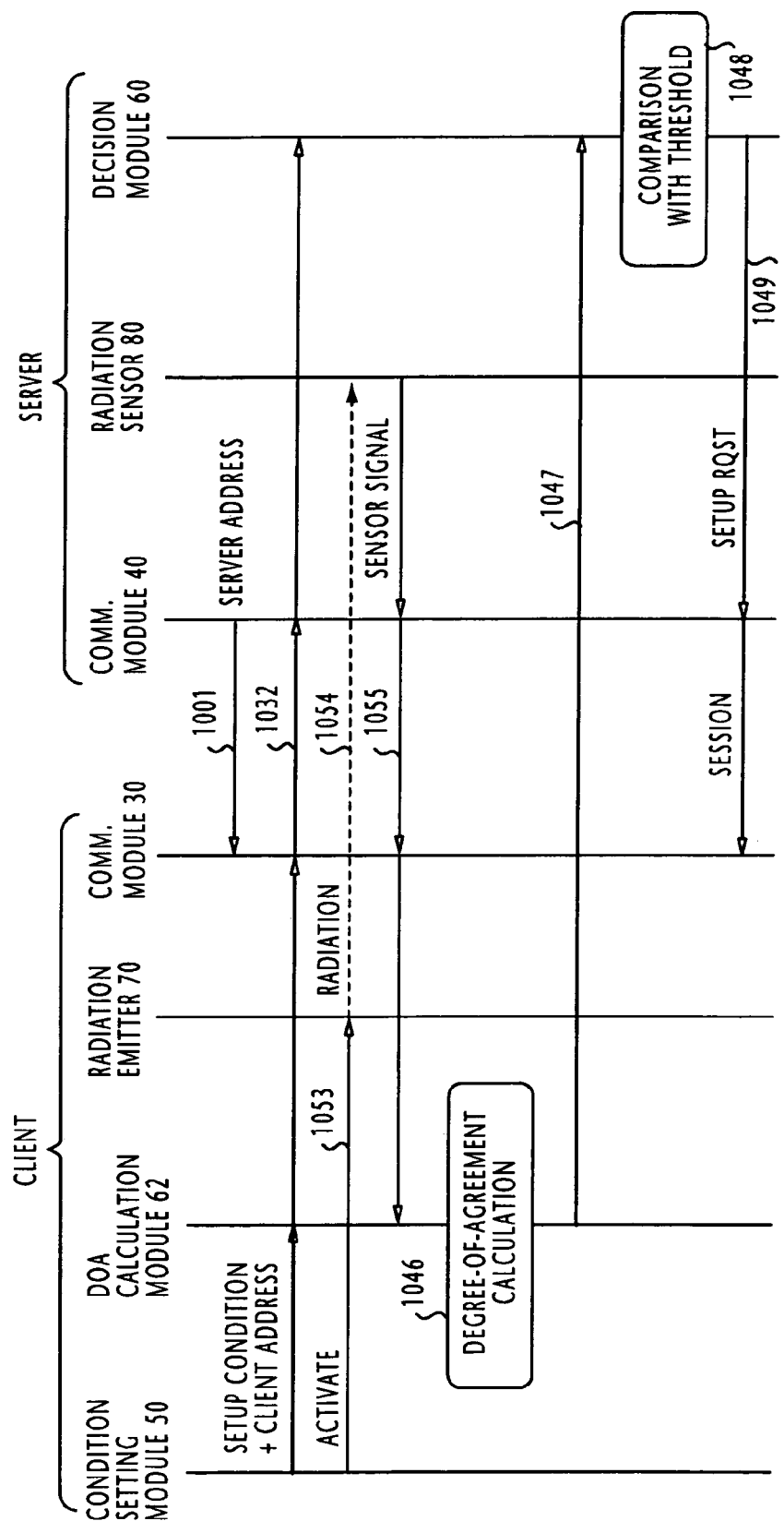
FIG. 41 is a sequence diagram of a session setup operation of the network of FIG. 40.

The eighth form of the second embodiment is shown in FIGS. 40 and 41, which is similar to the seventh form of the second embodiment (FIGS. 38 and 39) with the exception that the radiation emitter 70 is provided in each client terminal and the radiation sensor 80 is provided in the server terminal.

In FIG. 41, the operation of the network of FIG. 40 proceeds in the same manner as that of FIG. 39 with the exception that the condition setting module 62 of each client terminal activates its radiation emitter 70 (event 1053) to emit an infrared light beam to the server's radiation sensor 80. The sensor output is then transmitted in a message destined to each client terminal (event 1055) using the network addresses the server has received previously when event 1032 is performed. Each client terminal supplies this sensor signal to its DOA calculation module 62 to calculate its DOA value.

What is claimed is:

1. A communication system comprising:
   a common communication medium;
   a first communication terminal, connected to said common communication medium and having a first network address, the first communication terminal including an emitter for emitting a signal in space so that a sensor can detect said signal through said space to establish a private communication link between said emitter and said sensor; and
   a second communication terminal, connected to said common communication medium and having a second network address, the second communication terminal including said sensor for detecting said signal through said space,
      wherein said first communication terminal includes means for receiving an output signal of said sensor via said common communication medium, means for making a comparison between the output signal of said sensor and a decision threshold, and means for establishing a session via said common communication medium between said first and second network addresses if a strength indicated by said output signal is higher than said decision threshold, and
      wherein said first communication terminal is a client terminal and said second communication terminal is a server.

2. A communication system as claimed in claim 1, wherein the comparing means calculates a degree of agreement of the output of said sensor to said decision threshold and compares the calculated degree of agreement with a predetermined value.

3. A communications method as claimed in claim 1, wherein said decision threshold is established in said first communication terminal.

4. A communications method as claimed in claim 1, wherein said decision threshold is established in said second communication terminal.

5. A communication system comprising:
a common communication medium; and
first and second communication terminals, connected to said common communication medium, for jointly wirelessly establishing a private communication link therebetween when said terminals are brought close to each other,
said first and second communication terminals having first and second network addresses, respectively,
said first communication terminal comprising a sensor,
said second communication terminal comprising:
an emitter for emitting a signal in space SO that said sensor can detect said signal through said space to establish said private communication link between said emitter and said sensor; and
means for receiving an output signal of said sensor via said common communication medium and establishing said session if a strength indicated by said output signal is higher than a decision threshold,
wherein said second communication terminal includes means for making a comparison between the strength indicated by said output signal and a decision threshold, and
wherein said decision threshold is established in said first communication terminal.

6. A communication system as claimed in claim 5, wherein the comparing means calculates a degree of agreement of the strength to said decision threshold and compares the calculated degree of agreement with a predetermined value.

7. A communication system as claimed in claim 5, wherein said first communication terminal is a client terminal and said second communication terminal is a server.

8. A communication system as claimed in claim 5, wherein said first communication terminal is a server and said second communication terminal is a client terminal.

9. A communications network comprising:
a first communication terminal having a first network address;
a second communication terminal having a second network address; and
a common communication medium for interconnecting said first and second communication terminals,
said first and second communication terminals including means for jointly wirelessly establishing a private communication link if said first and second communication terminals are brought close to each other, communicating their network addresses to each other either via said common communication medium or said private communication link, and establishing a session between the communicated first and second network addresses via said common communication medium if said private communication link at a receiving end thereof has a strength greater than a decision threshold,
wherein said first communication terminal comprises a sensor, and wherein said second communication terminal comprises:
an emitter for emitting a signal in space so that said sensor can detect said signal through said space to establish said private communication link between said emitter and said sensor; and
means for receiving an output signal of said sensor via said common communication medium and establishing said session if the strength indicated by said output signal is higher than said decision threshold, and
wherein said first communication terminal is a server terminal and said second communication terminal is a client terminal.

10. A communications network as claimed in claim 9, wherein said session is established if a quotient of the strength of said private communication link by said decision threshold is greater than a predetermined value.

11. A communications network as claimed in claim 9, wherein said private communication link is an optical link.

12. A communications network as claimed in claim 11, wherein said optical link is an infrared light link.

13. A communications network as claimed in claim 11, wherein said optical link is a narrow beam of optical energy.

14. A communications network as claimed in claim 9, wherein said client terminal is a mobile terminal.

15. A communications network as claimed in claim 9, wherein said common communication medium is a local area network.

16. A communications network as claimed in claim 15, wherein said server terminal is one of a plurality of server terminals connected to said local area network, each of said server terminals having a unique network address.

17. A communications network as claimed in claim 15, wherein said common communication medium includes a wireless access unit for establishing said session between said client terminal and said server terminal via said local area network.

18. A communications network as claimed in claim 9, wherein said client terminal is responsible for establishing said session.

19. A communications network as claimed in claim 9, wherein said means for jointly wirelessly establishing a private communication link is an optical link that is in the form of a wide beam of optical energy for establishing a plurality of private communication links between said client terminal and a plurality of said server terminals.

20. A communications network as claimed in claim 9, wherein said common communication medium includes a wireless access unit for establishing a wireless link between said client terminal and said server terminal.

21. A communications network as claimed in claim 9, wherein said second communication terminal communicates said second network address to said first communication terminal via said common communication medium and said first communication terminal communicates said first network address to said second communication terminal via said common communication medium in response to receipt of said second network address from the second communication terminal.

22. A communications network as claimed in claim 9, wherein said second communication terminal communicates said second network address to said first communication terminal via said private communication link.

23. A communications network as claimed in claim 9, wherein said first communication terminal comprises:
means for calculating a degree of agreement of an output signal of said sensor to said decision threshold and communicating the calculated degree of agreement to said second communication terminal,
wherein said second communication terminal comprises:
means for communicating said decision threshold to said first communication terminal; and
means for establishing said session if the communicated degree of agreement is greater than a predetermined value.

24. A communications network as claimed in claim 9, wherein said first communication terminal further comprises:
means for communicating the output signal of said sensor to said second communication terminal via said common communication medium; and
means for communicating said decision threshold to said second communication terminal via said common communication medium.

25. A communications network as claimed in claim 24, wherein said second communication terminal communicates said second network address to said first communication terminal via said common communication medium.

26. A communications network as claimed in claim 24, wherein said second communication terminal communicates said second network address via said private communication link.

27. A communications network as claimed in claim 24, wherein said first communication terminal communicates said first network address via said common communication medium along with the communicated output signal of said sensor.

28. A communications network as claimed in claim 9, wherein said first communication terminal further comprises:
means for calculating a degree of agreement of the output signal of said sensor to said decision threshold and communicating the calculated degree of agreement to said second communication terminal,
wherein said second communication terminal comprises:
means for establishing said session when the communicated degree of agreement is greater than a predetermined value.

29. A communications network as claimed in claim 28, wherein said second communication terminal communicates said second network address to said first communication terminal via said common communication medium and said first communication terminal communicates said first network address to said second communication terminal via said common communication medium in response to receipt of said second network address from the second communication terminal.

30. A communications network as claimed in claim 28, wherein said second communication terminal communicates said second network address to said first communication terminal via said private communication link.

31. A communications network as claimed in claim 28, wherein said first communication terminal communicates said first network address to said second communication terminal via said common communication medium in response to receipt of said second network address from the second communication terminal.

32. A communication terminal for a communications network in which the communication terminal establishes communication with a second communication terminal via a common communication medium, wherein said communication terminal and the second communication terminal are each uniquely identified by a network address, comprising:
means for jointly wirelessly establishing a private communication link with said second communication terminal if said communication terminal and said second communication terminal are brought close to each other, means for communicating their network addresses to each other either via said common communication medium or said private communication link, and means for establishing a session between the communicated network addresses via said common communication medium if strength of said private communication link at a receiving end thereof is higher than a decision threshold;
wherein said communication terminal comprises a sensor, and wherein said second communication terminal comprises:
an emitter for emitting a signal in space to said sensor so that said private communication link is established between said emitter and said sensor;
means for receiving the output signal of said sensor via said common communication medium and establishing said session if said output signal is higher than said decision threshold; and
means for calculating a degree of agreement of the output signal to a predetermined agreement value and communicating the calculated degree of agreement to said communication terminal.

33. A communication terminal as claimed in claim 32, further comprising:
means for requesting said second communication terminal for activating said emitter to emit said signal.

34. A communication terminal as claimed in claim 32, wherein second communication terminal comprises means for calculating a degree of agreement of the output signal to said decision threshold and communicating the calculated degree of agreement to said communication terminal.

35. A communication terminal as claimed in claim 32, further comprising:
means for communicating said decision threshold to said second communication terminal; and
means for establishing said session when the calculated degree of agreement communicated from said second communication terminal is higher than a predetermined value.

36. A communication terminal as claimed in claim 32, further comprising means for releasing said session when the strength of said private communication link at said receiving end becomes lower than said decision threshold.

37. A communication terminal as claimed in claim 32, further comprising means for releasing said session in response to a command signal from an application layer.

* * * * *